United States Patent
Furuta

(10) Patent No.: US 9,039,113 B2
(45) Date of Patent: May 26, 2015

(54) PRINTING APPARATUS AND PRINTING METHOD

(71) Applicant: Seiko Epson Corporation, Tokyo (JP)

(72) Inventor: Tatsuo Furuta, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/198,951

(22) Filed: Mar. 6, 2014

(65) Prior Publication Data

US 2014/0285546 A1  Sep. 25, 2014

(30) Foreign Application Priority Data

Mar. 19, 2013  (JP) ................................. 2013-056204

(51) Int. Cl.
*H04N 1/405* (2006.01)

(52) U.S. Cl.
CPC .................................. *H04N 1/4057* (2013.01)

(58) Field of Classification Search
CPC ................................................. H04N 1/4057
USPC ............................................................ 347/9
See application file for complete search history.

(56) References Cited

U.S. PATENT DOCUMENTS 6,338,542 B1 *  1/2002  Fujimori ...................... 347/40

FOREIGN PATENT DOCUMENTS

JP  2010-179626  8/2010

* cited by examiner

*Primary Examiner* — Manish S Shah
*Assistant Examiner* — Jeffrey C Morgan

(57) ABSTRACT

There is provided a printing apparatus that includes a head unit which can form a plurality of dots of different sizes including a first dot and a second dot. The printing apparatus includes: a first print mode having a plurality of gradation reproduction regions including a first gradation reproduction region of a first print mode and a second gradation reproduction region of the first print mode; and a second print mode having a plurality of gradation reproduction regions including a first gradation reproduction region of a second print mode and a second gradation reproduction region of the second print mode. In the printing apparatus, a print speed in the first print mode is lower than a print speed in the second print mode, and the first gradation reproduction region of the first print mode is larger than the first gradation reproduction region of the second print mode.

8 Claims, 26 Drawing Sheets

FIRST PRINT MODE

SECOND PRINT MODE

TABLE 2-1 RECORDING METHODS IN INK JET PRINTER

TABLE 2-2 COMPARISON ON PHYSICAL PROPERTY OF DYE INK AND PIGMENT INK

| ITEMS | | DYE INK | | PIGMENT INK | |
|---|---|---|---|---|---|
| | | BLACK | CYAN | PHOTO BLACK | CYAN |
| VISCOSITY [mPa.s] | | 3.98 | 3.93 | 3.2 | 3.2 |
| SURFACE TENSION [mN/m] | | 32 | 32 | 27 | 27 |
| PH | | 8.5 | 8.5 TO 9.8 | 8.7 | 8.7 |
| SPECTRAL CHARACTERISTICS | $\lambda 1$ [nm] | 580 | 609 | 620 | 611 |
| | ABS | 1.87 | 1.71 | 1.22 | 1.52 |
| AVERAGE PARTICLE SHAPE [nm] | | – | – | 70±30 | 100±30 |
| SPECIFIC GRAVITY | | 1.069 | 1.069 | 1.048 | 1.044 |
| FREEZING TEMPERATURE [°C] | | −17 | −18 | −12 | −11 |

TABLE 2-3 COMPARISON ON CHARACTERISTICS OF DYE INK AND PIGMENT INK

|  | DYE INK | PIGMENT INK |
|---|---|---|
| STATE OF COLORING MATERIAL | SOLUTION | SCATTERED PARTICLE |
| ABSORPTION SPECTRUM | SHARP | BROAD |
| COLORING PROPERTY | ◎ | △ |
| FIXATION | ○ | △ |
| WATER RESISTANCE | △ | ◎ |
| LIGHT RESISTANCE | × | ◎ |

FIGURE 2-1 DEVIATION IN LANDING OF INK DROP

FIGURE 2-2 FORMING PROCESS OF SATELLITE

FIGURE 2-3 FORCES SUBJECTED TO INK DROP

FIGURE 2-4 DECELERATION CHARACTERISTICS
OF MAIN DOT AND SATELLITE
(Clio, VSD3M, Iw = 3.2 ng)

FIGURE 3-1 DEVIATION IN LANDING OF SATELLITES

FIGURE 3-2 BENDING OF MAIN DOTS

FIG. 15

TABLE 3-1 EVALUATION STANDARD OF WIND RIPPLE

| | CHARACTERISTICS OF PATTERN THAT FORMS WIND RIPPLE | CRITERIA FOR DETERMINATION OF WIND RIPPLE (VISUALLY) | EVALUATION RANK |
|---|---|---|---|
| WIND RIPPLE NOT EXIST | – | NOT VISIBLE | 4 |
| WIND RIPPLE EXISTS | A: SCATTERING OF SATELLITE | VISIBLE | A3 |
| | | PROMINENT | A2 |
| | | VERY PROMINENT | A1 |
| | B: BENDING OF MAIN DOT | VISIBLE | B3 |
| | | PROMINENT | B2 |
| | | VERY PROMINENT | B1 |
| | A AND B | VISIBLE | C3 |
| | | PROMINENT | C2 |
| | | VERY PROMINENT | C1 |

FIG. 16

TABLE 3-2 RELATIONSHIP BETWEEN WIND RIPPLE AND PG (Clio)

| PG (mm) | Vh (V) | PRINT MODE | Iw (ng) | CR (CPS) | Vm (m/s) | WIND RIPPLE EVALUATION | TENDENCY |
|---|---|---|---|---|---|---|---|
| 0.98 | Vh | VSD3L | 7.7 | 200 | 10 | 4 | ↓ |
| 1.2 | Vh | VSD3L | 7.7 | 200 | 9.8 | A3 | |
| 1.7 | Vh | VSD3L | 7.7 | 200 | 9.3 | A1 | |
| 2.1 | Vh | VSD3L | 7.7 | 200 | 9.1 | A1 | |
| 4.5 | Vh | VSD3L | 7.7 | 200 | – | NO DEVIATION IN LANDING | |

FIGURE 3-3 FLIGHT STATE OF INK DROP
(VSD3L, Vm=7.6 m/s)

FIGURE 3-4 FLIGHT STATE OF INK DROP
(VSD3L, Vm=9.6 m/s)

TABLE 3-3 RELATIONSHIP BETWEEN WIND RIPPLE AND Vm, Iw AND PRINT MODE

|  | Vh (v) | Vm (m/s) | Iw | WIND RIPPLE EVALUATION |
|---|---|---|---|---|
| VSD3L | Vh−4 | 7.3 | 5.5 | 4 |
|  | Vh−3.5 | 7.6 | 6 | A3 |
|  | Vh−3 | 7.9 | 6.2 | A2 |
|  | Vh−2.5 | 8.2 | 6.5 | A2 |
|  | Vh−2 | 8.5 | 6.7 | A1 |
|  | Vh | 9.6 | 7.7 | A1 |
| VSD3M | Vh | 9.3 | 3.2 | 4 |
|  | Vh+1 | 10.3 | 3.4 | 4 |
|  | Vh+1.5 | 10.8 | 3.5 | A2 |
|  | Vh+2 | 11.3 | 3.6 | A2 |
|  | Vh+3 | 12.3 | 3.8 | A1 |
|  | Vh+4 | 13.3 | 4 | A1 |
| VSD3S | Vh | 8.7 | 1.6 | 4 |
|  | Vh+2 | 10.5 | 1.8 | 4 |
|  | Vh+4 | 12.3 | 2 | 4 |
|  | Vh+5 | 13.2 | 2.1 | 4 |
|  | Vh+5.5 | 13.6 | 2.15 | A3 |
|  | Vh+6 | 14.1 | 2.2 | A2 |

|  | Vh (v) | Vm (m/s) | Iw | WIND RIPPLE EVALUATION |
|---|---|---|---|---|
| VSD1S | Vh−0.5 | 7.25 | 7.75 | 4 |
|  | Vh | 7.5 | 8 | A3 |
|  | Vh+0.5 | 7.75 | 8.25 | A2 |
|  | Vh+1 | 8 | 8.5 | A2 |

FIG. 21

TABLE 3-4 RELATIONSHIP BETWEEN CARRIAGE SPEED AND WIND RIPPLE

| PG (mm) | Vh (V) | PRINT MODE | CR (CPS) | WIND RIPPLE EVALUATION | TENDENCY |
|---|---|---|---|---|---|
| 1.7 | Vh | VSD1L | 200 | A2 | ↓ |
| 1.7 | Vh | VSD2L | 220 | A1 | |
| 1.7 | Vh | VSD3L | 200 | A1 | |
| 1.7 | Vh | ECO | 300 | A1 | |

FIG. 22

TABLE 3-5 RELATIONSHIP BETWEEN DRIVE FREQUENCY OF WAVE FORM AND WIND RIPPLE

| PG (mm) | Vh (V) | PRINT MODE | F VALUE | CR (CPS) | WIND RIPPLE EVALUATION | TENDENCY |
|---|---|---|---|---|---|---|
| 1.7 | Vh | VSD3L | 1/4 F | 200 | 4 | |
| 1.7 | Vh | VSD3L | 1/3 F | 200 | 4 | WIND RIPPLE PHENOMENON NOT SEEN OTHER THAN IN Fmax |
| 1.7 | Vh | VSD3L | 1/2 F | 200 | 4 | |
| 1.7 | Vh | VSD3L | Fmax | 200 | A1 | |

FIG. 23

TABLE 3-6 RELATIONSHIP BETWEEN NUMBER OF NOZZLES SIMULTANEOUSLY DRIVEN AND WIND RIPPLE

| PG (mm) | Vh (V) | PRINT MODE | DUTY NUMBER OF NOZZLES SIMULTANEOUSLY DRIVEN | CR (CPS) | WIND RIPPLE EVALUATION | TENDENCY |
|---|---|---|---|---|---|---|
| 1.7 | Vh | VSD3L | 20 | 200 | 4 | ↓ |
| 1.7 | Vh | VSD3L | 30 | 200 | 4 | |
| 1.7 | Vh | VSD3L | 45 | 200 | A2 | |
| 1.7 | Vh | VSD3L | 60 | 200 | A1 | |
| 1.7 | Vh | VSD3L | 90 | 200 | A1 | |
| 1.7 | Vh | VSD3L | 180 | 200 | A1 | |

FIG. 24

TABLE 3-7 RELATIONSHIP BETWEEN INTERVAL OF NOZZLES AND WIND RIPPLE

| PG (mm) | Vh (V) | PRINT MODE | DUTY | CR (CPS) | WIND RIPPLE EVALUATION | TENDENCY |
|---|---|---|---|---|---|---|
| 1.7 | Vh | VSD3L | 25% | 200 | 4 | ↓ |
| 1.7 | Vh | VSD3L | 50% | 200 | 4 | |
| 1.7 | Vh | VSD3L | 70% | 200 | 4 | |
| 1.7 | Vh | VSD3L | 75% | 200 | 4 | |
| 1.7 | Vh | VSD3L | 90% | 200 | A3 | |
| 1.7 | Vh | VSD3L | 95% | 200 | A2 | |
| 1.7 | Vh | VSD3L | 100% | 200 | A1 | |

FIG. 25

TABLE 3-8 RELATIONSHIP BETWEEN INTERVAL OF COLUMNS THAT SIMULTANEOUSLY DRIVES AND WIND RIPPLE

| | DRIVE WAVE FORM MODE | | EVALUATION (COLUMN B, D, F, H) | TENDENCY |
|---|---|---|---|---|
| | VSD1L | VSD1S | | |
| TWO COLUMNS SIMULTANEOUS DRIVE | COLUMN A | COLUMN B | C1 | ↑ |
| | | COLUMN D | A2 | |
| | | COLUMN F | A3 | |
| | | COLUMN H | 4 | |

FIG. 26

TABLE 3-9 RELATIONSHIP BETWEEN SIZE OF INK DROP IN ADJACENT COLUMN AND WIND RIPPLE

| | DRIVE WAVE FORM MODE | | EVALUATION (COLUMN B) | TENDENCY |
|---|---|---|---|---|
| | COLUMN B- PhotoBk | COLUMN A- Clear | | |
| COLUMN 1 | VSD1S | BSD IN PRINTING | 4 | ↓ |
| COLUMN 2 | VSD1S | VSD1S | A3 | ↓ |
| | VSD1S | VSD1M | A2 | |
| | VSD1S | VSD1L | C1 | |

FIGURE 3-6 COMPARISON OF FLIGHT STATE OF INK (VSD1S, COLUMN B)
(LEFT: ADJACENT COLUMN A DOES NOT DRIVE,
RIGHT: ADJACENT COLUMN A VSD1L) –Clio FIGURE 3-9 DEVIATION IN LANDING OF SATELLITE AT WIND RIPPLE BEGINNING POSITION (MODEL DIAGRAM)

FIGURE 4-1 MODEL DIAGRAM OF NUMERICAL ANALYSIS SIMULATION OF WIND RIPPLE

TABLE 4-1 INITIAL CONDITION FOR NUMERICAL SIMULATION OF WING RIPPLE

| CONDITIONS | FREQUENCY (KHz) | NUMBER OF NOZZLES | PARTICLE DIAMETER ($\mu$m) | | PARTICLE SPEED (m/s) | |
|---|---|---|---|---|---|---|
| | | | MAIN DOT DIAMETER | SATELLITE DIAMETER | Vm | Vs |
| I | 14.4 | 5 | 21 | 17 | 9.5 | 8 |
| II | 28.8 | 1 | 21 | 17 | 9.5 | 8 |
| III | 28.8 | 5 | 21 | 17 | 9.5 | 8 |
| IV | 28.8 | 5 | 21 | 10 | 9.5 | 5 |

FIGURE 4-2 BOUNDARY CONDITION OF AIR FLOW

FIGURE 4-3 AIR FLOW IN +Y AXIS DIRECTION

FIGURE 4-4 SPEED DISTRIBUTION OF AIR FLOW (EXPERIMENTAL CONDITION I, 5 NOZZLES, 14.4 KHz, APPROXIMATELY 35 ms AFTER DISCHARGE)

LEFT: SURFACE X-Z, +Z AXIS DIRECTION, Y = 2.54 mm
MIDDLE: SURFACE Y-Z, +Y AXIS DIRECTION, X = 0.688 mm
RIGHT: SURFACE X-Y, +Y AXIS DIRECTION, Z = 1.68 mm

FIGURE 4-5 SPEED DISTRIBUTION OF AIR FLOW (EXPERIMENTAL CONDITION II, 1 NOZZLE, 28.8 KHz, APPROXIMATELY 35 ms AFTER DISCHARGE)

LEFT: SURFACE X–Z, +Z AXIS DIRECTION, Y = 2.54 mm

MIDDLE: SURFACE Y–Z, +Y AXIS DIRECTION, X = 0.688 mm

RIGHT: SURFACE X–Y, +Y AXIS DIRECTION, Z = 1.68 mm

FIGURE 4-6 SPEED DISTRIBUTION OF AIR FLOW (EXPERIMENTAL CONDITION III, 5 NOZZLES, 28.8 KHz, APPROXIMATELY 35 ms AFTER DISCHARGE)

LEFT: SURFACE X–Z, +Z AXIS DIRECTION, Y = 2.54 mm

MIDDLE: SURFACE Y–Z, +Y AXIS DIRECTION, X = 0.688 mm

RIGHT: SURFACE X–Y, +Y AXIS DIRECTION, Z = 1.68 mm

FIGURE 4-7 DEVIATION IN LANDING OF SATELLITE IN X AXIS DIRECTION (SECOND NOZZLE FROM CENTER, CONDITION III)

FIGURE 4-8 DEVIATION IN LANDING OF SATELLITE IN X AXIS DIRECTION (SECOND NOZZLE FROM CENTER, CONDITION IV)

FIGURE 5-1 SCHEMATIC DIAGRAM OF CONFIGURATION OF PIV SYSTEM

FIGURE 5-2 CALCULATION METHOD IN PIV SYSTEM

FIGURE 5-3 AIR FLOW IN PRINTER-PG PORTION

FIG. 42

TABLE 6-1 WIND RIPPLE PHENOMENON SUPPRESSION MEASUREMENT AND REALIZATION THEREOF

| | WIND RIPPLE SUPPRESSION MEASUREMENT | PROBLEMS TO SOLVE | REALIZATION | CORRESPONDING WIND RIPPLE PHENOMENON |
|---|---|---|---|---|
| A | DECREASE PG | SHEET RUBBING | △ | DEVIATION IN LANDING OF SATELLITE |
| B | DECREASE DRIVE FREQUENCY | PRINT SPEED DETERIORATES | △ | |
| C | DECREASE NUMBER OF NOZZLES THAT SIMULTANEOUSLY DRIVE, AND INCREASE NUMBER OF PASS | PRINT SPEED DETERIORATES, PROBLEM OF BUNTING | △ | DEVIATION IN LANDING OF SATELLITE |
| D | INCREASE INTERVAL OF NOZZLES | PRINT SPEED DECREASES, IMAGE RESOLUTION DETERIORATES | × | |
| E | IMPROVE PHYSICAL PROPERTY OF INK | DISCHARGE CHARACTERISTICS OF INK | △ | |
| F | OPTIMIZE ARRANGEMENT OF NOZZLE ARRAY THAT SIMULTANEOUSLY DRIVE (INCREASE GAP) | NOTHING | ○ | BENDING OF MAIN DOT |
| G | OPTIMIZE DOT SIZE DISCHARGED FROM ADJACENT NOZZLE ARRAY | NOTHING | ○ | BENDING OF MAIN DOT |
| H | CHECKING AIR FLOW IN PRINTER APPARATUS, REMOVE AIR FLOW DUE TO CARRIAGE MOVEMENT BY PROVIDING VENTILATION PORT OR WIND GENERATION DEVICE | DIFFICULT IN DESIGN SIZE OF PRINTER HOUSING INCREASES | △ | DEVIATION IN LANDING OF SATELLITE, BENDING OF MAIN DOT |

PRINTING APPARATUS AND PRINTING METHOD

BACKGROUND

1. Technical Field

The present invention relates to a printing apparatus and a printing method.

2. Related Art

An ink jet printer that performs printing by discharging an ink from a plurality of nozzles. In the ink jet printer, printing is performed by a relative movement between a printing head that includes a plurality of nozzles which discharges the ink, and a printing medium.

In the ink jet printer, for example, there is a case where airflow turbulence occurs between the printing head and the printing medium due to a relative movement between a carriage on which the printing head that includes a nozzle array made of a plurality of nozzles is mounted and the printing medium. When an ink drop lands on a position deviated from the desired position on the printing medium due to such air turbulence, there is a case where a density irregularity called "wind ripple" occurs in a printed image (print image), for example. With regard to this problem, in JP-A-2010-179626, a recording apparatus that includes an ink jet recording head is disclosed, which has a carriage that moves over a recording medium, a plurality of discharge ports which are arrayed on the bottom surface of the carriage and from which liquid is discharged when the carriage is moving, and a movable member that is provided in front of the moving direction of the carriage and causes airflow to be generated toward the front of the moving direction of the carriage when the carriage is moving.

In the technology disclosed in JP-A-2010-179626, by providing the movable member that causes airflow to be generated toward the front of the moving direction of the carriage, the airflow flowing in between the discharge port and the recording medium can be prevented without depending on the movement speed of the carriage. In this way, it is possible to stably generate the airflow for reducing the wind ripple. However, when such a movable member is separately provided to the printing apparatus, there is a concern that the structure of the printing apparatus becomes complicated and the manufacturing cost of the printing apparatus increases. In addition, in order to print an image with a high resolution at a high speed, for example, measures such as; increasing the number of nozzles used for printing a predetermined range, increasing the frequency of discharging ink, and increasing the relative movement speed between a head unit and the printing medium, are taken. However, even taking such measures, there is a case where such the generation of the airflow surrounding the head unit and the airflow toward the printing medium from the head unit are caused, and thus the wind ripple occurs. Therefore, by merely providing the movable member to the printing apparatus, there is a case where it is difficult to reduce the wind ripple that is generated for various reasons. In addition, in the printing apparatus in which the wind ripple can be reduced, a reduction in cost, a saving of resources, an ease of manufacturing, and an improvement in usability are desired.

SUMMARY

The invention can be realized in the following aspects or application examples.

(1) According to an aspect of the invention, there is provided a printing apparatus that includes a head unit which can form a plurality of dots of different sizes including a first dot and a second dot on a printing medium using an ink. The printing apparatus in this aspect includes: a first print mode having a plurality of gradation reproduction regions including a first gradation reproduction region of a first print mode which uses the first dot and does not use the second dot and a second gradation reproduction region of the first print mode which uses the first dot and the second dot; and a second print mode having a plurality of gradation reproduction regions including a first gradation reproduction region of a second print mode which uses the first dot and does not use the second dot and a second gradation reproduction region of the second print mode which uses the first dot and the second dot. In the printing apparatus, the first dot is smaller than the second dot, a print speed in the first print mode is lower than a print speed in the second print mode, and the first gradation reproduction region of the first print mode is larger than the first gradation reproduction region of the second print mode. According to the printing apparatus in this aspect, in the first print mode, the printing is performed at a lower print speed than in the second print mode; in addition, since the second dot is not used and the first dot is used, the reproduced gradation region is large. For this reason, in the first print mode, the printing with a high image quality can be performed. In addition, in general, when the print speed is high, there is a tendency that the wind ripple becomes prominent. However, in the second print mode where the print speed is higher than in the first print mode, the first gradation reproduction region where the first dot is used and the second dot is not used is small. That is, in the second print mode, the second dot having a large size is used instead of the first dot having a small size. Accordingly, it is possible to suppress the occurrence of the wind ripple.

(2) In the printing apparatus in the above-described aspect, the first print mode may include a third gradation reproduction region of the first print mode which does not use the first dot and uses the second dot, and the second print mode may include a third gradation reproduction region of the second print mode which does not use the first dot and uses the second dot, and the third gradation reproduction region of the first print mode may be smaller than the third gradation reproduction region of the second print mode. According to the printing apparatus in this aspect, in the first print mode, it is possible to perform the printing in which the gradation region reproduced without using the first dot is small. In addition, in the second print mode, since the second dot having a large size is used instead of the first dot having a small size, the number of nozzles (nozzle density) used for recording the dot decreases. Accordingly, the occurrence of airflow caused by the recording of the dot on the printing medium can be decreased, and thus, the occurrence of the wind ripple on the printed image can be suppressed.

(3) In the printing apparatus in the above-described aspect, a distance between the printing medium and the head unit in the first print mode may be shorter than a distance between the printing medium and the head unit in the second print mode. As a result of the experiment by the inventors, there is a tendency that the wind ripple becomes prominent as the distance between the printing medium and the head unit increases. However, according to the printing apparatus in this aspect, in the first print mode, since the distance between the printing medium and the head unit is short, the occurrence of the wind ripple on the printed image can be suppressed.

(4) In the printing apparatus in the above-described aspect, a discharge speed of the first dot in the first print mode may be lower than a discharge speed of the first dot in the second print mode. As a result of the experiment by the inventors, there is a tendency that the wind ripple becomes prominent as the discharge speed of dot increases. However, in the printing apparatus in this aspect, in the first print mode, since the discharge speed is low, the occurrence of the wind ripple on the printed image can be suppressed.

(5) In the printing apparatus in the above-described aspect, a maximum relative movement speed between the printing medium and the head unit per unit time in the first print mode may be lower than a maximum relative movement speed between the printing medium and the head unit per unit time in the second print mode. As a result of the experiment by the inventors, there is a tendency that the wind ripple becomes prominent as the maximum relative movement speed of the printing medium and the head unit per unit time increases. However, in the printing apparatus in this aspect, in the first print mode, since the maximum relative movement speed between the printing medium and the head unit per unit time is low, the occurrence of the wind ripple on the printed image can be suppressed.

(6) In the printing apparatus in the above-described aspect, an ink discharge frequency from the head unit in the first print mode may be lower than an ink discharge frequency from the head unit in the second print mode. As a result of the experiment by the inventors, there is a tendency that the wind ripple becomes prominent as the ink discharge frequency increases. However, in the printing apparatus in this aspect, in the first print mode, since the ink discharge frequency is low, the occurrence of the wind ripple on the printed image can be suppressed.

Not all of a plurality of configuration elements included in each aspect of the invention described above is essential to the invention. In order to achieve a part or all of the effects described in this specification, with regard to a part of the plurality of configuration elements, a modification, a deletion, a substitution by a new configuration element, and a deletion of some content of limitation can appropriately be performed. In addition, in order to achieve a part or all of the effects described in this specification, a part or all of the technical features included in an aspect of the invention described above can be combined with a part or all of the technical features included in another aspect of the invention described above, to form an independent aspect of the invention.

The invention can be realized in various aspects other than the printing apparatus. For example, it is possible to realize aspects such as: a printing method, a method of manufacturing the printing apparatus, a method of controlling the printing apparatus, a computer program for realizing those methods, and functions of an apparatus or system, and a recording medium in which the computer program is stored.

BRIEF DESCRIPTION OF THE DRAWINGS

The invention will be described with reference to the accompanying drawings, wherein like numbers reference like elements.

FIG. 15 illustrates an evaluation standard of a wind ripple.
FIG. 16 illustrates a relation between the wind ripple and PG (Clio).
FIG. 21 illustrates a relationship between the carriage speed and the wind ripple.
FIG. 22 illustrates a relationship between a drive frequency of a wave form and the wind ripple.
FIG. 23 illustrates a relationship between the number of nozzles that are simultaneously driven and the wind ripple.
FIG. 24 illustrates a relationship between a gap between the nozzles and the wind ripple.
FIG. 25 illustrates a relationship between a gap of columns that are simultaneously driven and the wind ripple.
FIG. 26 illustrates a relation between a size of the ink drop from an adjacent column and the wind ripple.
FIG. 42 is a diagram illustrating measures for suppressing the wind ripple and feasibility of the measures.

DESCRIPTION OF EXEMPLARY EMBODIMENTS

A. Embodiment

A1. Configuration of Apparatus

Figure 1:
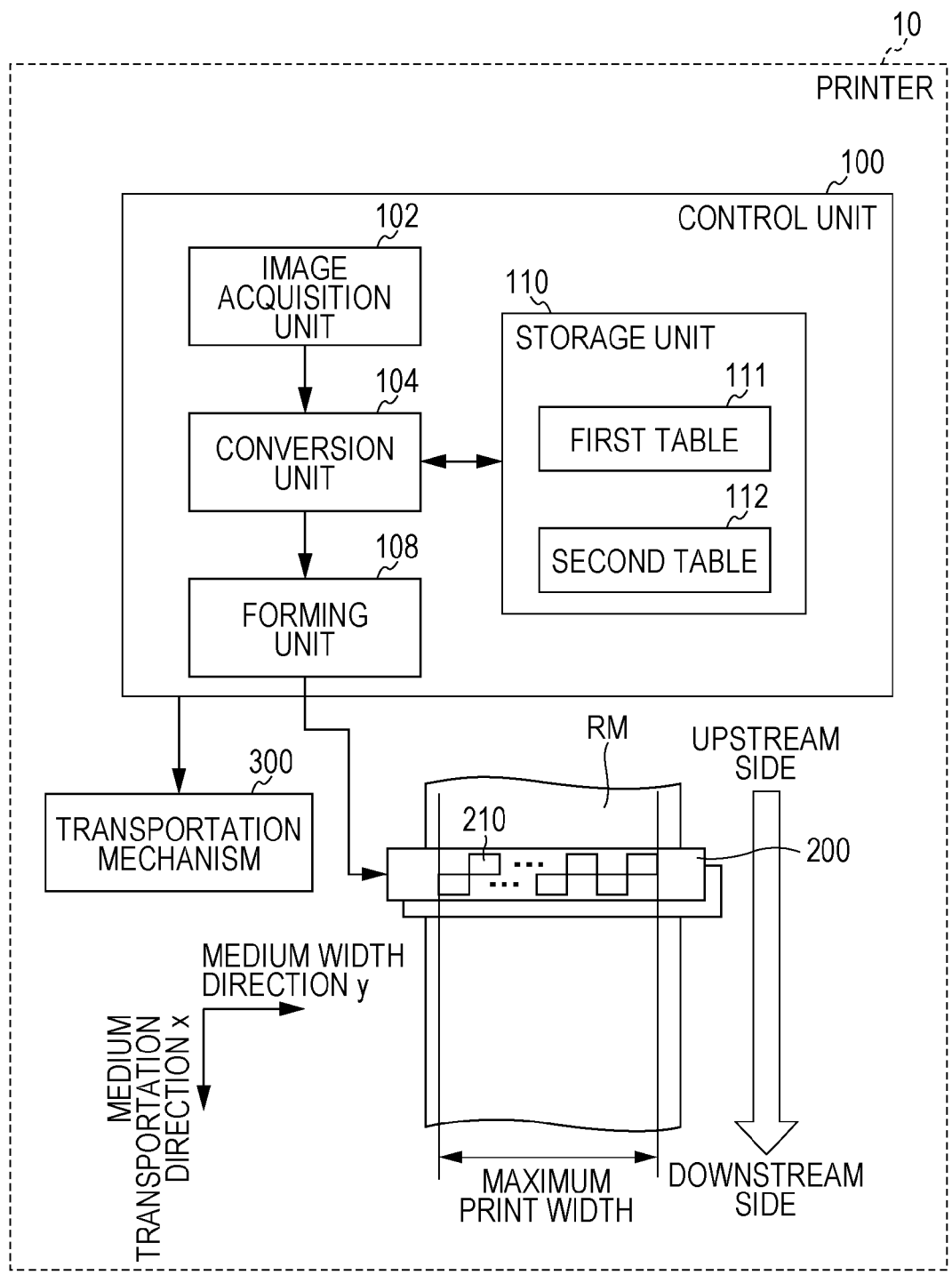
FIG. 1 illustrates a schematic configuration of a printer.

FIG. 1 is a diagram illustrating a schematic configuration of a printer 10 as a printing apparatus according to an embodiment of the invention. The printer 10 in the embodiment is a so-called line head type printer that performs printing without a main scanning of a printing head. The printer 10 includes a control unit 100, a head unit 200, and a transportation mechanism 300. The printer 10 in the embodiment is capable of printing by a first print mode in which high quality printing at a relatively low print speed can be performed, and a second print mode in which printing at a relatively high speed can be performed.

The head unit 200 includes a plurality of nozzle units 210. The nozzle unit 210 is arranged in a zigzag shape in such a manner that a gap between adjacent nozzles is to be the maximum printing width and remains constant. The nozzle unit 210 includes a plurality of nozzles. The plurality of nozzles are arrayed in the zigzag shape in a width direction x of the medium which intersects a transportation direction y of the printing medium RM, and configures a nozzle array. The plurality of nozzles that configure each nozzle array is not necessarily arrayed in the zigzag shape along the nozzle array direction, but for example, may be arrayed on a straight line along the nozzle array direction.

The nozzles are accommodated in an ink cartridge (not illustrated) which is connected to the head unit 200, and discharges the ink. The nozzle unit 210 includes a piezoelectric element in the ink path to the nozzle. The piezoelectric element controls an amount of the ink drops discharged from each nozzle according to the voltage applied to the piezoelectric element. In this way, by varying the amount of ink drops per each discharge, the printer 10 can form dots having different types of sizes on the printing medium RM. In the embodiment, the printer 10 can form the dots having three types of sizes: small, medium, and large. The small dot corresponds to "a first dot", the medium dot corresponds to "a second dot" in this specification.

The transportation mechanism 300 includes a medium feed motor (not illustrated) and a transportation belt (not illustrated). The medium feed motor causes the transportation belt to be driven. The transportation belt transports the printing medium RM from an up-stream side to a down-stream side in a maximum print width of the head unit 200 owing to the driving by the medium feed motor.

The control unit 100 is configured to include a CPU, a ROM, a RAM, an EEPROM, and the like (all not illustrated) that are connected to each other on a bus. By a program stored in the ROM and EEPROM being executed in the RAM, the control unit 100 controls the operation of each unit of the printer 10 such as, for example, the transportation mechanism 300, the head unit 200, and the like. In addition, the control unit 100 also functions as an image acquisition unit 102, a conversion unit 104, and a forming unit 108. The processing performed by each of those functional units will be described below. Moreover, at least a part of the function realized by the CPU may be realized by an electric circuit included in the control unit 100 being operated based on the circuit configuration of the electric circuit.

A2. Print Processing

In a case where a first print mode is designated by a user, the control unit 100 performs the printing by executing (A) to (E) described below.
(A) Determining a nozzle duty (total duty) by a first table 111.
(B) Making a distance between the printing medium RM and the head unit 200 shorter than that of the second print mode.
(C) Making an ink discharge speed lower than that of the second print mode.
(D) Making a maximum relative movement speed of the head unit 200 and the printing medium RM per unit time lower than that of the second print mode.
(E) Making a discharge frequency in which the ink is discharged from the head unit 200 lower than that of the second print mode.

Specifically, the print processing is performed in an order described below. When the print processing is started, the user designates a print mode which is associated with a print speed (STEP S10). In the embodiment, the user can designate any of the first print mode or the second print mode. The second print mode is a mode in which the printing is performed at a higher speed than that of the first print mode. For example, the user can designate the second print mode if the print speed is focused on, and can designate the first print mode if the resolution is focused on.

When the print mode is designated by the user, the CPU, as a processing of the image acquisition unit 102, acquires RGB type image data from a personal computer (not illustrated) connected to the printer 10 or a memory card (not illustrated) incorporated in the printer 10, or the like (STEP S20). When the image data is acquired, the CPU, as a processing of the conversion unit 104, converts the RGB type image data to multi-gradation data which represents a gradation value of each color; cyan C, magenta M, yellow Y and black K that are used in the printer 10, using a color conversion lookup table (not illustrated) included in the EEPROM (STEP S30).

Next, the CPU, as the processing of the conversion unit 104, selects a table in the storage unit 110 based on the selected print mode (STEP S40). The conversion unit 104 selects a first table 111 in a case where the first print mode is selected (STEP S50), and selects a second table 112 in a case where the second print mode is selected (STEP S60). Each of the first table 111 and the second table 112 will be described below. The CPU, as a processing of the conversion unit 104, converts the image data converted to the multi-gradation data, to ON/OFF data among a small dot, a medium dot, and a large dot based on the selected table (STEP S70).

Next, the CPU, as a processing of the forming unit 108, performs an interlace processing (STEP S80). When the interlace processing is performed, the CPU, as a processing of the forming unit 108, controls the medium feed motor, the printing head 210 and the like, and causes the ink to be discharged from the nozzles of the printing head 210 to perform the printing (STEP S90). In addition, the control unit 100 controls the operation of transportation mechanism 300 or the head unit 200 based on the selected print mode, and performs (B) to (E) described above.

Figure 2:
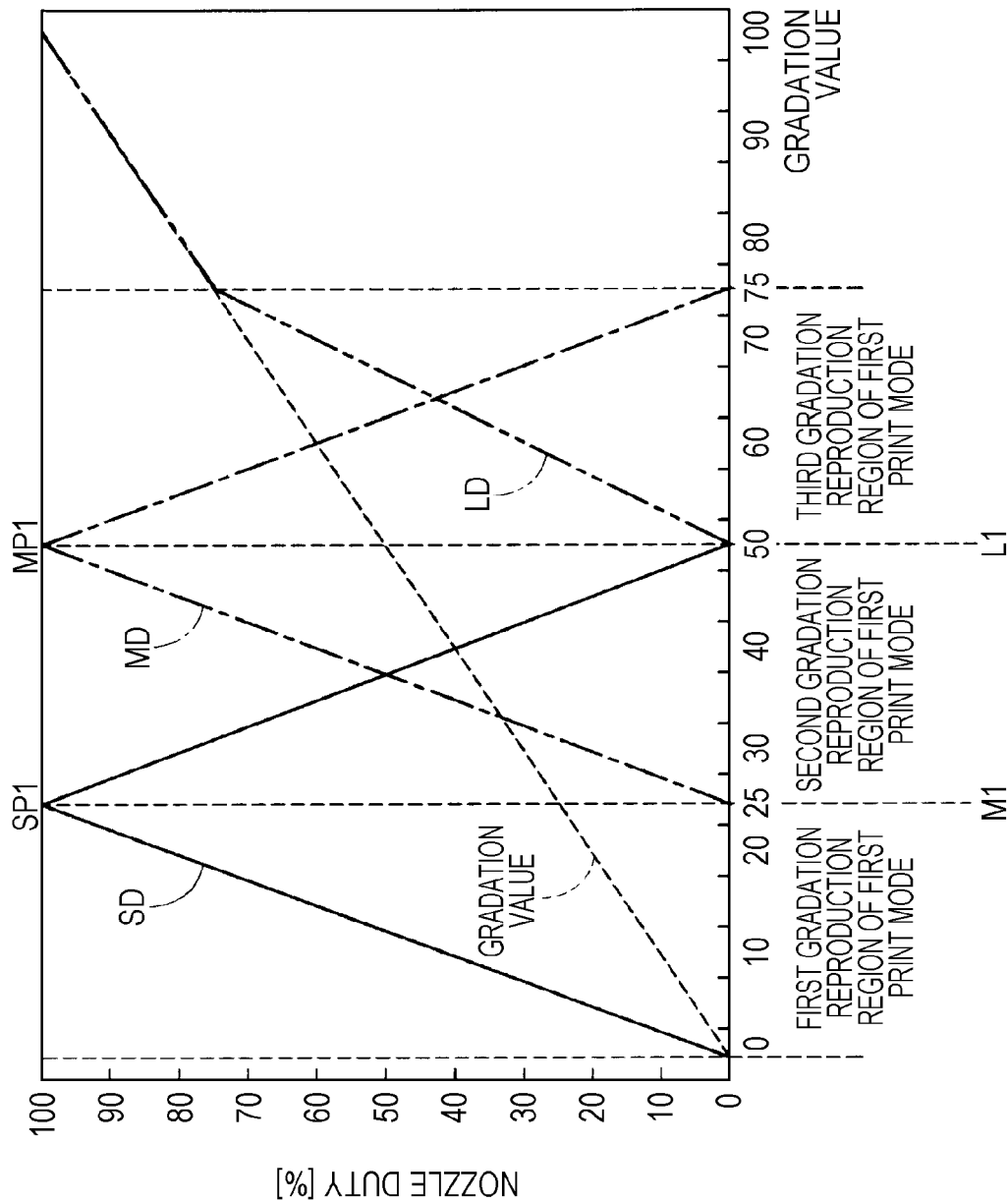
FIG. 2 illustrates a first table stored in a storage unit.
Figure 3:
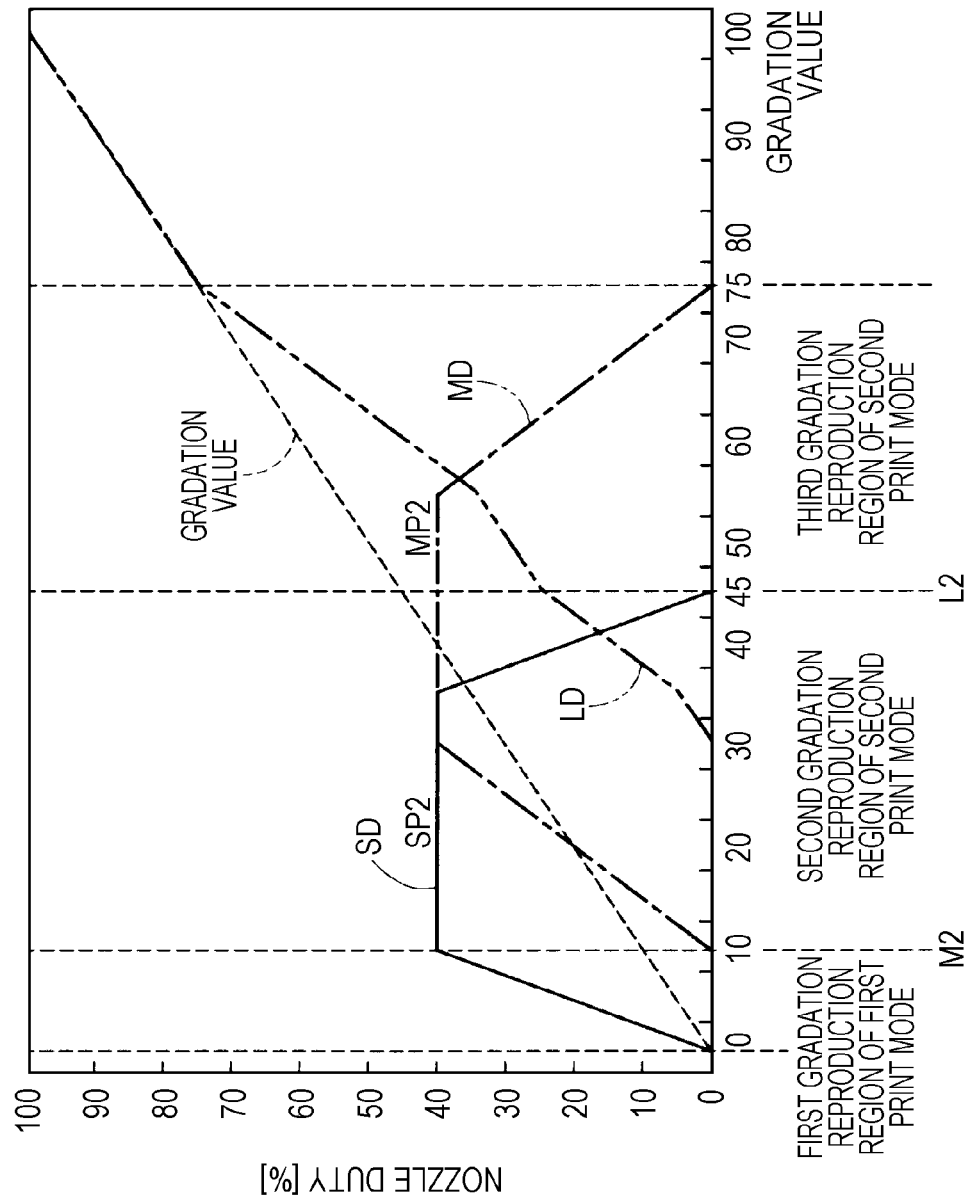
FIG. 3 illustrates a second table stored in a storage unit.

FIG. 2 is a diagram illustrating the first table 111 stored in the storage unit 110 in the embodiment. FIG. 3 is a diagram illustrating the second table 112 stored in the storage unit 110 in the embodiment. In each table, a horizontal axis represents a gradation value of the image data and a vertical axis represents a using proportion of the nozzle used for reproducing the gradation value (nozzle duty). Moreover, in the embodiment, the gradation value of the image data is reproduced by an area gradation method using a single or a plurality of small dots, medium dots which are larger than small dots, and large dots which are larger than medium dots. The gradation value in the present specification represents a lighter color when the value is smaller, and a darker color when the value is larger, for example, in a case of the black ink having a gradation value "zero", the color reproduced by the area gradation using the black ink is white, in a case of the black ink having a gradation value "100", the color reproduced by the area gradation using the black ink is black, and in a case of the black ink having a gradation value "50" (maximum value 100), the color reproduced by the area gradation using the black ink is grey. The nozzle duty in the present specification indicates a value expressed as: the number of nozzles used in a case where the gradation value "100" is reproduced is set to a denominator, and the number of nozzles used in a gradation to be reproduced is set to a numerator. A profile SD in FIG. 2 and FIG. 3 indicates the duty of the small dots, a profile MD indicates the duty of the medium dots, and a profile LD indicates the duty of the large dots.

The gradation value M1 (25%) illustrated in FIG. 2 is the gradation value from which the medium dots start to be used, and the gradation value L1 (50%) is the gradation value from which the large dots start to be used, in the first print mode where the first table 111 is used. The gradation value M2 (10%) illustrated in FIG. 3 is the gradation value from which the medium dots start to be used, and the gradation value L2 (45%) is the gradation value from which the large dots start to be used, in the second print mode where the second table 112 is used.

Moreover, as illustrated in FIG. 2, in the first print mode where the first table 111 is used, the small dots are used until the gradation value becomes 25% and the medium dots are not used. The gradation value ranged from 0% to 25% corresponds to a "first gradation reproduction region of the first print mode" in the present specification. In addition, in a range of the gradation value from 25% to 50%, the small dots and the medium dots are used. The gradation value ranged from 25% to 50% corresponds to a "second gradation reproduction region of the first print mode" in the present specification. In addition, in the gradation value ranged from 50% to 75%, the medium dots and the large dots are used and the small dots are not used. The gradation value ranged from 50% to 75% corresponds to a "third gradation reproduction range" of the first print mode in the present specification.

Similarly, as illustrated in FIG. 3, in the second print mode where the second table 112 is used, the small dots are used until the gradation value becomes 10% and the medium dots are not used. The gradation value ranged from 0% to 10% corresponds to a "first gradation reproduction region of the second print mode" in the present specification. In addition, in the gradation value ranged from 10% to 45%, the small dots and the medium dots are used. The gradation value ranged from 10% to 45% corresponds to a "second gradation reproduction region of the second print mode" in the present specification. In addition, in the gradation value ranged from 45% to 75%, the medium dots and the large dots are used and the small dots are not used. The gradation value ranged from 45% to 75% corresponds to a "third gradation reproduction range of the second print mode" in the present specification.

Comparing FIG. 2 and FIG. 3, the gradation value L2 (45%) in the second table 112 is lower than the gradation value L1 (50%) in the first table 111. In addition, the gradation value M2 (10%) from which the medium dots start to be used in the second table 112 is lower than the gradation value M1 (25%) from which the medium dots start to be used in the first table 111.

Furthermore, the peak value SP2 of the duty of the small dots in the second table 112 is approximately 40% while the peak value SP1 of the duty of the small dots in the first table 111 is approximately 100%. In addition, the peak value MP2 of the duty of the medium dots in the second table 112 is approximately 40% while the peak value MP1 of the duty of the medium dots in the first table 111 is approximately 100%. That is, the peak value SP2 of the duty of the small dots in the second table 112 is lower than the peak value SP1 of the duty of the small dots in the first table 111. In addition, the peak value MP2 of the duty of the medium dots in the second table 112 is lower than the peak value MP1 of the duty of the medium dots in the first table 111. For this reason, when the gradation value in which the small dots are recorded the most is compared per unit area, less small dots are recorded in the second print mode than that of the first print mode. In addition, when the gradation value in which the medium dots are recorded the most is compared per unit area, less small dots are recorded in the second print mode than that of the first print mode.

Comparing FIG. 2 and FIG. 3, in the first gradation reproduction region where only the small dots are used, the following relationship is established.

The first gradation reproduction region of the first print mode>The first gradation reproduction region of the second print mode    (1)

In addition, in the third gradation reproduction region where the small dots are not used, the following relationship is established.

The third gradation reproduction region of the first print mode<The third gradation reproduction region of the second print mode    (2)

Figure 4:
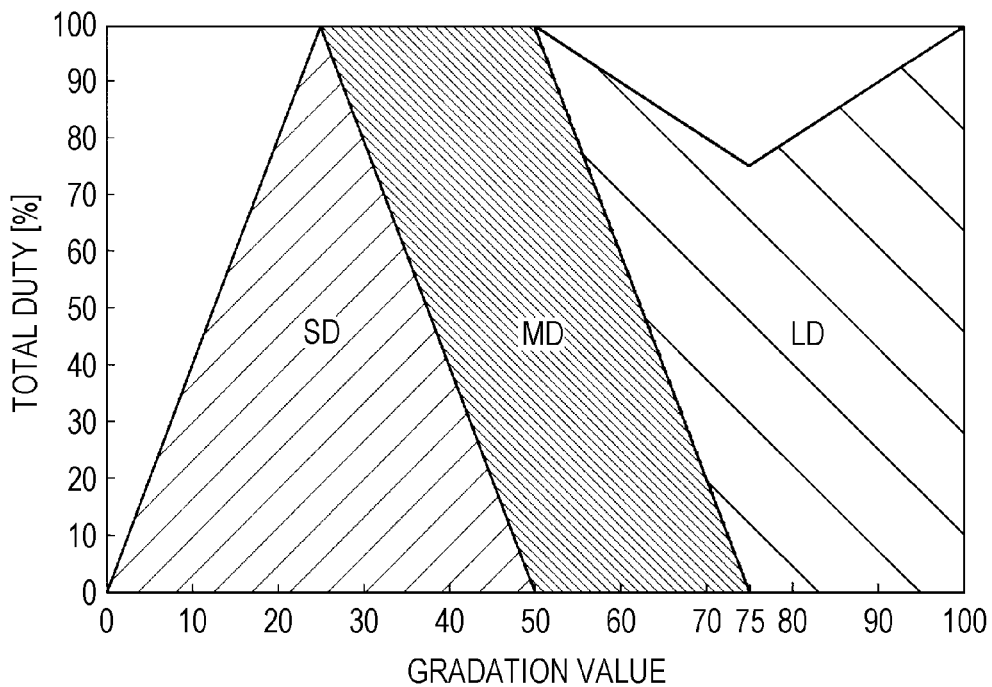
FIG. 4 illustrates a total duty in a first print mode.
Figure 5:
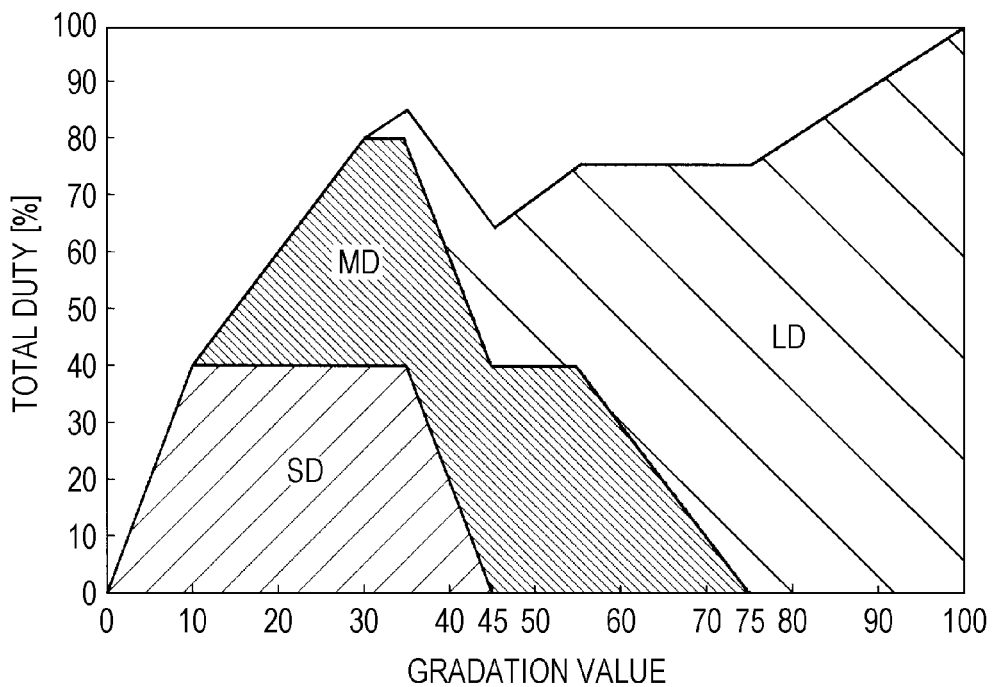
FIG. 5 illustrates a total duty in a second print mode.

FIG. 4 is a diagram illustrating the gradation value and a total nozzle duty which is a combined total of the nozzle duties of the small dots, medium dots, and large dots in the first print mode where the first table 111 is used. FIG. 5 is a diagram illustrating the gradation value and a total nozzle duty in the second print mode where the second table 112 is used. As can be seen by the comparison between FIG. 4 and FIG. 5, in the second print mode where the print speed is higher than that of the first print mode, the printing of which the total nozzle duty is decreased is performed.

The printer in the embodiment, in the second print mode where a comparatively high speed printing is performed, the medium dots start to be recorded instead of the small dots and the large dots start to be recorded instead of the medium dots in the lower gradation than in the first print mode where a low speed printing is performed. In addition, in the second print mode, the maximum duty value of the small dots and the maximum duty value of the medium dots are controlled to be lower compared to those in the first print mode. For this reason, even in the second print mode where the comparatively high speed printing is performed, since the total duty decreases, it is possible to suppress the occurrence of the wind ripple in the printed image.

In addition, the printer in the embodiment, in the first print mode, further controls such that: (B) the distance between the printing medium RM and the head unit 200 is shorter than that of the second print mode, (C) the ink discharge speed is lower than that of the second print mode, (D) the maximum relative movement speed of the head unit 200 and the printing medium RM per unit time is lower than that of the second print mode, (E) the discharge frequency in which the ink is discharged from the head unit 200 is lower than that of the second print mode. By the controls of (B) to (E), it is possible to suppress the occurrence of the wind ripples on the printed image. Accordingly, high quality printing can be performed. Moreover, the reason why it is possible to suppress the occurrence of the wind ripples on the printed image by the controls of (B) to (E) becomes clear by the following studies and experiments.

B. Study on Occurrence and Suppression of Wind Ripple

The present inventors have performed a study and experiment as described below, regarding the occurrence and suppression of the wind ripple. As a result, it is found that, by adopting the configuration described above, it is possible to suppress the occurrence of the wind ripples.

Chapter 1. Introduction 1-1 Preface

Recently, with digital cameras becoming wide spread, there is a rapid increase of users who output pictures at home resulting in an expanding market of ink jet printers compatible with quality of photographic images. Image quality comparable to silver halide photographs can easily be in hand at home. Meanwhile, from a simple peripheral device connected to a personal computer, an ink jet printer becomes an output device necessary for creating a home photographic system.

1-2 High Speed and High Image Quality of Ink Jet Printer

In order to improve the image quality of the ink jet printer, a level improvement in a variety of elemental technologies of a printer is desired. Out of them, the following elemental technology is particularly important.
1. Technology for Controlling the Ink Drop Discharge
A. Minimizing the ink drop in size B. Modulation technology for the ink drop C. Stability in ink discharge D. Accuracy in ink discharge
2. Technology for Processing the Image Quality
A. Decreasing the graininess of the image B. Color reproduction in a wide range and fidelity C. Halftone technology
3. Technology of Ink
A. Physical properties for stable discharge (viscoelasticity, viscosity, surface tension, wetting property) B. Reliability, light resistance, water resistance, weather resistance, and storage stability of ink C. Color of the ink and color reproduction range
4. Technology on Media
A. Sheet corresponding to photographic image quality B. Receptivity, fixing ability, quick-dying and permeability with respect to the ink C. Storage stability of the media
5. Mechanical Control Technology
A. Head control mechanism with high accuracy B. Technology on sheet feeding with high accuracy In order to realize the improvement of the print speed, the following technology can be considered.
1. Discharge the ink drop in a high frequency (response of the ink in the high frequency is required).
2. Increase the number of nozzles (Increase the density of the nozzle array).
3. Vary an amount of ink drop discharge in a wide range.
4. Decrease the number of flushing.
5. Print even in an acceleration or deceleration range of the carriage, or decrease the acceleration or deceleration range of the carriage.
6. Decrease the number of scanning of the head when the printing is performed.

A variety of technology innovations was performed for realizing the printing in a high speed. Print speed was improved by the spread of those technologies, but resulted in new challenges at the same time. The wind ripple is one of the problems out of those challenges. The fact that the wind ripple phenomenon is amplified by introducing the technology in which: the ink drop is discharged in a higher frequency than before, the nozzle density is increased, and the image is printed with less number of Pass, and the like, can be understood by Chapter 3 described below. There is a possibility that the wind ripple may significantly impair the image quality. An improvement in suppressing the wind ripple phenomenon while promoting the high-speed printing is desired.

First, a mechanism of occurrence of the wind ripple will be clarified and a measure for improvement in suppressing the wind ripple will be studied by: extracting the parameters that affect the wind ripple, analyzing the relationship between the parameters and the wind ripple qualitatively, establishing a hypothesis about the wind ripple, and simultaneously, performing a numerical simulation, and discovering conditions causing the wind ripple to occur from the result of the experiment and the simulation.

Chapter 2. Recording Method in Ink Jet Printer and Characteristics of Ink Discharge In this chapter, the recording method in the ink jet printer, the ink, the medium, and characteristics of ink discharging will be described.

2-1 Recording Method in Ink Jet Printer

Figures 6, 7:
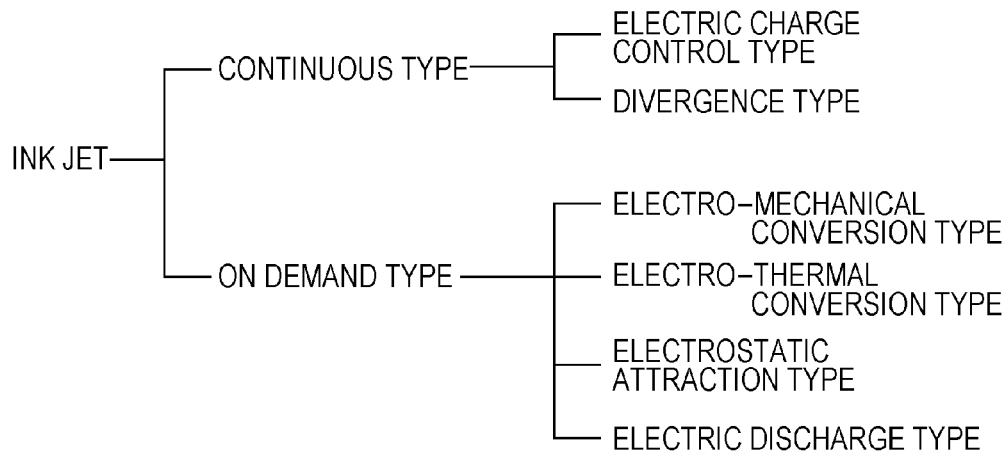
FIG. 6 illustrates recording methods in the ink jet printer.
FIG. 7 illustrates a comparison of physical property values of a dye ink and a pigment ink.

The recording method in the ink jet printer is a method in which the ink drop is discharged from the fine nozzle, and is directly attached on the medium to be printed. The recording method is illustrated in Table 2-1 (FIG. 6). The recording method is divided into two types: in a continuous type, the ink drop is discharged continuously, only the necessary movement of the ink is controlled by the electric field, and is led to the predetermined recording medium; and in an on-demand type, the ink is discharged only at the time when the discharging is required for printing. The home-use ink jet printer currently on the market is close to an on-demand type. Among them, an electro-mechanical conversion type in which a liquid drop is discharged by a piezoelectric-deform and an electro-thermal conversion type in which bubbles are generated by the heat, are mainstream. In an ink jet head using a piezoelectric element, a meniscus and the ink drop is easily controlled, and the ink can be selected freely.

2-2 Ink for Ink Jet Printer

There are two kinds of ink currently used in the home-use ink jet printer. One is a water-soluble dye ink and the other is a pigment ink. Various factors are required for the ink for ink jet printer since the ink has to be instantaneously discharged as a drop through a small nozzle having a diameter of approximately 20 μm. In addition, in the technology for improving the image quality in the ink jet recording, the ink is a very important factor in determining the final properties. The characteristics of the ink required for ink jet recording include the following factors.
A. Reliability Factor
  Physical properties of ink to perform stable printing (viscosity, surface tension, and wetting property)
  Clog-free composition for short and long term leaving
  Stability of the ink with respect to a contact material (head, ink cartridge and other members)
  Long term storage stability of the ink
B. Print Characteristics Factor
  Good color and color reproduction range
  Plain paper compatibility (quick-drying and color bleeding)
  Durability of the recording material (light resistance, water resistance, moisture resistance, and gas resistance)

Physical Properties Comparison of Dye Ink and Pigment Ink

Figures 8, 9:
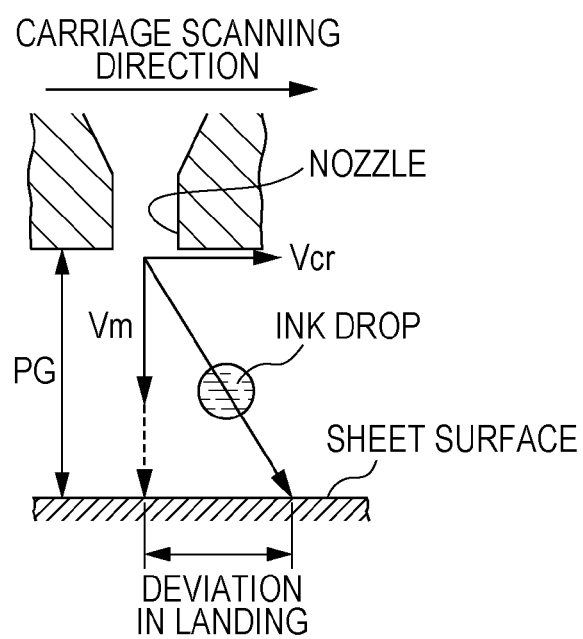
FIG. 8 illustrates a comparison of characteristics of the dye ink and the pigment ink.
FIG. 9 illustrates a deviation in landing of an ink drop.

Table 2-2 (FIG. 7) is a table comparing the physical property values of the dye ink and pigment ink. In the dye ink, it can be seen that the viscosity, the surface tension, and the like are not largely different from those in the pigment ink. Table 2-3 (FIG. 8) is a table comparing the characteristics of the dye ink and the pigment ink.

In the related art, the dye ink has been mainly used as a color material for the ink jet printer. That is because the dye ink has a comparatively good reliability and a coloring property is excellent. On the other hand, recently, the pigment-based ink is also developed and is attracting attention from the viewpoint of light resistance, printability, and storage stability. The pigment ink is insoluble in the medium. A pigment molecule which is a color material is dispersed in the ink as a particle. Being different from the dying material which is soluble in the medium, not all of the molecules of the pigment material existing as particles are in the same environment. For this reason, the absorption spectrum becomes broad and the transparency of the printed material is low compared to the dye ink. In addition, since the coloring is related to only the portion of pigment material on a part of the particle surface, even when the pigment material exists in the ink is destroyed by the light, the pigment material that exists under one layer emits a color. Therefore, apparent color fading does not occur, and excellent light resistance can be exerted.

Development of the coloring material is promoted, which has good storage stability such as light resistance and moisture resistance in addition to high color saturation and high coloring, with sufficient understanding of the characteristics of the dying material and the pigment material regarding the ink for ink jet printer and with solving various problems thereof.

2-3 Recording Medium of Ink Jet Printer

In the ink jet recording, a recording medium is a very important factor for realizing a high image quality. Recently, in order to obtain an image with a high image quality, a dedicated paper on which a coating is applied is used. In this case, the ink is trapped into the coated layer, and the image with a high accuracy where a blur is suppressed can be obtained.

In order to realize the high image quality, it is desirable that the ink jet recording medium has the following characteristics.
A. Capable of forming a dot with high circularity
B. Ink absorption is high, and a width of OD value widely changes based on an amount of the ink absorption
C. High ink absorption speed such that the print and color unevenness, aggregation unevenness do not occur
D. Glossiness that shows a hue of a photograph
E. High precision transport The image with the high image quality can be obtained by using the dedicated paper. However, since a dot diameter is small compared to that of a plain piece of paper, the wind ripple due to the landing deviation of satellite occurs significantly compared to that on the plain piece of paper.

2-4 Characteristics of Ink Discharging in Ink Jet Printer

In the ink jet recording, the ink drop is formed in such a fine area of the printer head nozzle with a diameter of approximately 20 μm in a time scale of 0.2 ms or less. The shape of the formed ink drop affects an influence on the print quality.

As illustrated in Table 2-2 (Table 7), the viscosity and the surface tension of the ink for ink jet printer is approximately 3 to 4 mPa·s and 20 to 40 mN/m respectively. The ink drop is formed in an extremely short time. Therefore, in order to clarify the characteristics of ink discharge, the short timing property of the ink in the time scale is very important. In general, the low-viscosity liquid such as the ink for ink jet can be regarded as a Newtonian fluid. However, in the high speed phenomenon, the influence of the dynamic viscoelasticity of the corresponding time scale cannot be ignored, and it is believed that an extensional viscosity of the ink also relates with regard to the operation mode which is discharged from the nozzle.

In this chapter, the movement of the ink drops discharged from the nozzle, forming of the satellite, changes in power to receive will be studied in detail based on the characteristics of the head and the physical properties of the ink described above, and the result thereof will become basic data for the numerical simulation.

2-4-1. Discharging and Landing of the Ink Drops

The ink jet printer performs printing by discharging the ink drop from the carriage on which the head is mounted moving in a horizontal direction (main scanning direction) at a constant speed over a position (PG) approximately 1 to 2 mm away from the sheet surface. Therefore, as illustrated in FIG. 2-1 (FIG. 9), the ink drop lands on the point of the sheet surface that is slightly deviated in the carriage moving direction from the point where the ink drop is discharged.

Here, the deviation in landing of the ink drop in the carriage moving direction will be studied using Formulae described below.

Time to landing T is expressed by Expression (2-1) below.

$$T = \frac{PG}{Vm} \quad (2\text{-}1)$$

T: Time to landing

The deviation between the ink discharge position and the landing position is expressed by Expression (2-2) below.

$$\Delta l = Vcr \times T \quad (2\text{-}2)$$

Δl: deviation between the ink discharge position and the landing position

Here, if a difference between a flying speed of the ink drop in the column and between the columns is considered, the relative deviation of an ink drop is expressed by Expression (2-3) below.

$$\Delta l' = Vcr \times PG \times \left(\frac{1}{Vma} - \frac{1}{Vmb}\right) \quad (2\text{-}3)$$

Δl': relative deviation of ink drop
Vma: flying speed of ink drop a
Vmb: flying speed of ink drop b It is needless to say that the deviation in landing of the ink drop significantly influences the image quality. However, according to the expressions described above, a parameter that most influences the relative deviation in landing is the difference in flying speed of the ink drop. In addition, it can be understood that the deviation in landing of the ink drop depends upon the carriage speed and PG.

In order to avoid the deviation in landing of the ink drop in the carriage moving direction, theoretically a method described below is considered to be effective.

A. Reducing a variation in $V_m$ in the column and between the columns
B. Reducing PG
C. Increasing the discharge speed of the ink
D. Decreasing the carriage speed However, among these measures, if the discharge speed of the ink is increased according to C, the flying state of the ink tends to be unstable, thus a balance between Vm and the discharge stability may be required to be considered. The measure D may lead to a deterioration in print speed. It is considered that taking the measures A and B is the most effective.

As will be described below, the ink drop is discharged from the nozzle, divided into a main dot and a satellite, and lands with the speed being decreased due to the viscose resistance of air.

2-4-2. Forming of Satellite and Risk thereof.

Figure 10:
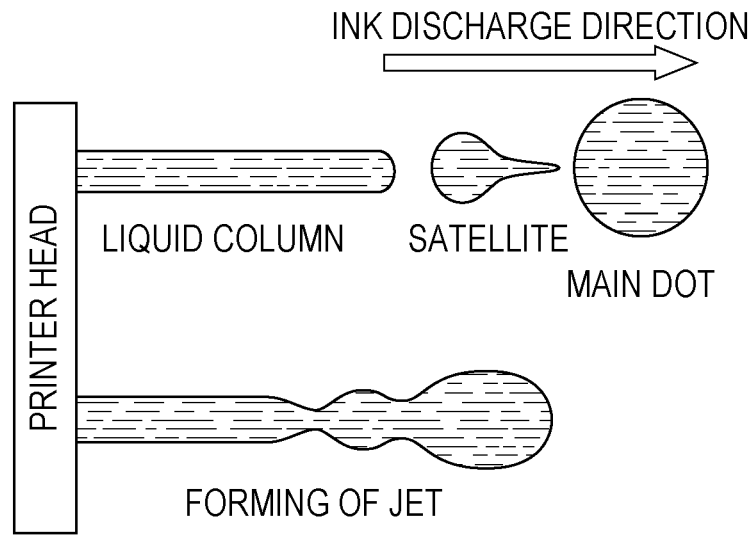
FIG. 10 illustrates a forming process of a satellite.

The process of forming the ink drop by the ink discharged from the nozzle of the printer head is illustrated in FIG. 2-2 (FIG. 10). Amplitude of a constriction of the discharged ink column increases by the surface tension with the distance from the nozzle increasing, and when the ink column arrives at a certain position, the ink forms an ink drop. During the process, an unnecessary particle with a small diameter is generated, which is called a satellite.

The satellite impairs the image quality and the generation thereof is related to the viscosity of the ink. When the viscosity of the ink is low, the discharge speed of the ink increases, and thus the satellite is easily generated. In reverse, when the viscosity is high, the generation of the satellite can be suppressed but the discharge speed of the ink decreases. In order to satisfy the printing characteristics, it is necessary to ensure an ink discharge speed higher than a certain level. For this reason, it is considered that the avoidance of the generation of the satellite is difficult.

The satellite influences the image quality as follows.

A. The satellite does not land on the intended position and forms a pattern such as a wind ripple on the medium.
B. The satellite turns into mist and does not land on the medium but floats in the apparatus and causes problems such as dirtying the apparatus.
C. Since the satellite does not land on the medium, the weight of the ink is not obtained as designed. Therefore, it cannot be filled solid which results the influence on the OD value.

2-4-3. Movement of Ink Drop

A. Air Resistance

The ink drop receives an air resistance after the discharge. There are viscous resistance (proportional to the discharge speed of the ink) and inertial resistance (proportional to the square of the discharge speed of the ink) in the air resistance. It is believed that the viscose resistance works on an object of which the speed is low and the inertial resistance works on an object of which the speed is high. In the flying ink drop, an examination on which parameter is dominant is performed.

The viscose resistance is expressed by Expression (2-4) below and the inertial resistance is expressed by Expression (2-5) (The ink drop is assumed to be a sphere shape).

$$F1 = 6\pi\eta r V_m \quad (2\text{-}4)$$

$F_1$: viscose resistance
$\eta$: viscose coefficient of air ($\mu = 1.82 \times 10^{-4}$ (g/cm³·s)
r: radius of the ink drop
Vm: speed of the ink drop $$F_2 = \frac{\pi}{4}\rho r^2 V_m^2 \quad (2\text{-}5)$$

$F_2$: inertial resistance
$\rho$: density of air ($\rho = 1.205 \times 10^{-3}$ (g/cm³))

In above expressions, if Vm=800 (cm/s), weight of the ink=3 ng, density of the ink=1.06 (g/cm³), since F1>>F2, it can be seen that the viscose resistance is dominant in the air resistance of the ink drop.

In addition, this tendency becomes more conspicuous as the radius of the ink drop decreases and the speed of the ink drop decreases.

B. Flying Speed of the Ink

Figure 11:
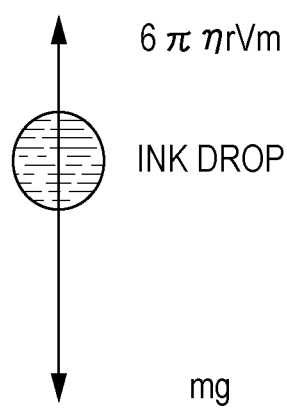
FIG. 11 illustrates a force to receive the ink drop.

FIG. 2-3 (FIG. 11) is a diagram illustrating forces which are subjected to the ink drop.

If Newton's equation of motion is applied to the movement of the ink drop, Expression (2-6) is obtained.

$$F = m\frac{dv}{dt} = mg - 6\pi\eta r V_m \quad (2\text{-}6)$$

Here, if K is defined as below, Expressions (2-7) and (2-8) are obtained.

$$\frac{dv}{dt} = g - \frac{K}{m}V_m \quad (2\text{-}7)$$

(K is set to $6\pi\eta r$)

$$\frac{1}{\left(\frac{m}{K}g - v_m\right)}dv = \frac{K}{m}dt \quad (2\text{-}8)$$

If Expression (2-8) is integrated, Expression (2-9) and (2-10) below are obtained.

$$\ln\left(\frac{m}{K}g - V_m\right) = -\frac{K}{m}t + C \quad (2\text{-}9)$$

C: integration constant $$V_m = \frac{mg}{K} + \exp\left(-\frac{K}{m}t + C\right) \quad (2\text{-}10)$$

The initial speed of the ink drop when t=0 is defined as Expression (2-11) below. The relationship between the discharging time and the flying speed of the ink can be understood using Expression (2-11).

$$Vm = \frac{mg}{K} + \left(V_{mo} - \frac{mg}{K}\right)\exp\left(-\frac{K}{m}t\right) \quad (2\text{-}11)$$

(The initial speed of the ink drop at t=0 is $V_{m0}$)

2-4-4. Deceleration of Main Dot and Satellite

Figure 12:
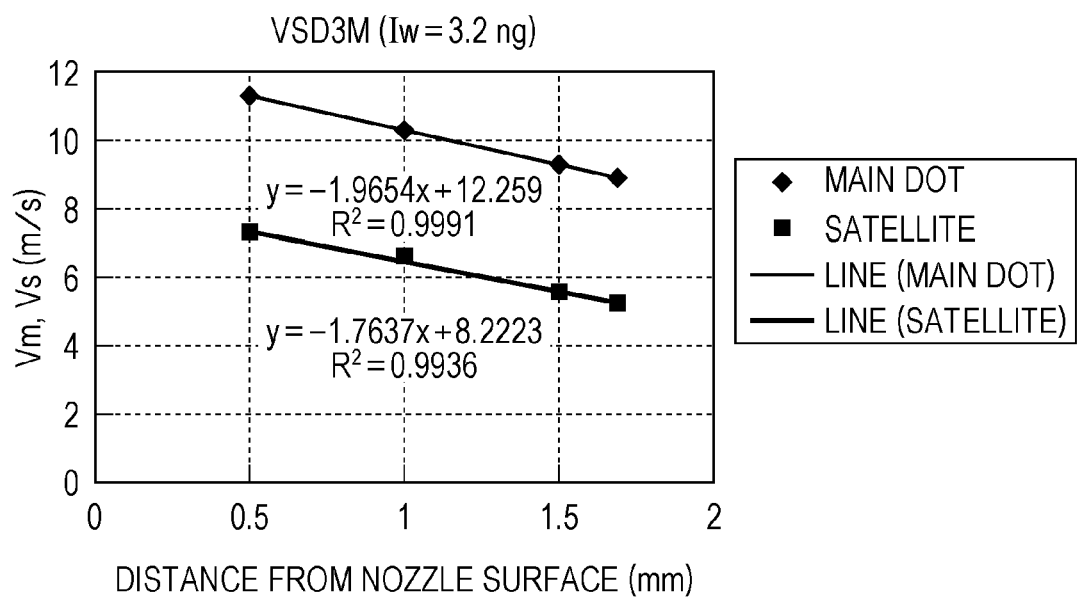
FIG. 12 illustrates deceleration characteristics of a main dot and the satellite.

The ink drop is divided into the satellite and the main dot after the discharging, and lands on the medium respectively while decelerating the speed. FIG. 2-4 (FIG. 12) is a graph illustrating the deceleration characteristics of the main dot and the satellite in the VSD3M mode of Clio.

In order to perform an experiment of wind ripple simulation, it is necessary to check the weight relationship of the satellite and the main dot. It is possible to calculate the weight of the satellite and the main dot using the fact that a speed variation rate and the weight of the ink drop have a proportional relationship.

The relationship between the speed variation rate and the weight is expressed by Expression (2-12) below.

$$M_m^{-\frac{2}{3}}:M_s^{-\frac{2}{3}} = dV_m:dV_s \qquad (2\text{-}12)$$

Relation between the radius r and weight m of the ink drop: $r \propto m^{1/3}$

The speed variation rate of the main dot and satellite is set to $dV_m$ and $dV_s$ respectively.

Here, the sum of the weight M of the main dot and the satellite is expressed by Expression (2-13) below.

$$M = M_m + M_s \qquad (2\text{-}13)$$

Rewritten Expression (2-12) is expressed as Expressions (2-14) and (2-15).

$$M_m = \left(\frac{dV_m^{-2/3}}{dV_m^{-2/3} + dV_s^{-2/3}}\right)M \qquad (2\text{-}14)$$

$$Ms = \left(\frac{dVs^{-2/3}}{dV_m^{-2/3} + dV_s^{-2/3}}\right)M \qquad (2\text{-}15)$$

It is possible to calculate the weight of the main dot and the satellite using $dV_m$ and $dV_s$ obtained by the experiment.

2-4-5. Relation between Flying State of Ink Drop and Reynolds Number (Re)

Considering the flight of the ink drop in a hydrodynamic point of view, it is believed that the fluid properties of the ink drop discharged from the nozzle is determined by the relationship between the inertial force that causes the ink to be discharged and the viscose force that prevents the ink from being discharged. In the fluid dynamics, the ratio of the viscous force and the inertial force is expressed by the Reynolds number (Re). The fluid properties of the ink drop can be examined by Re. In addition, Re is also used in explaining fluid problems such as flow of air, forming of vortex in the flow field, and the like.

The Reynolds number (Re) is expressed by Expression (2-16) below.

$$R_e = \frac{\text{INERTIAL FORCE}}{\text{VISCOUS FORCE}} \propto \frac{r_n V_m \rho}{\eta} \qquad (2\text{-}16)$$

$r_n$: diameter of nozzle
$\rho$: density of ink
$\eta$: viscosity of ink

In consideration of the constant, the Reynolds number (Re) is expressed by Expression (2-17) below.

$$R_e \propto V_m \qquad (2\text{-}17)$$

$r_n$, $\rho$, and $\eta$ are constants that depend on the physical properties of the head and the ink.

2-5. Forming Condition of Mist and Relationship Between Wind Ripple and Mist

It is believed that mist is formed by the reasons described below.

A. When borderless printing is performed, the ink drop cannot land on the sheet and turns into mist.
B. When flushing is performed, the ink drop cannot land on the cap and turns into mist.
C. Under a certain drive condition, the satellite with a small diameter and a sub-satellite is formed and receives an influence of airflow raised by the movement of the carriage, and thus, cannot land on the sheet and floats inside the apparatus as mist.

The following risks are caused by the floating mist in the apparatus.
A. Dirty inside the apparatus.
B. A problem of dirtying an encoder and making the position of the carriage unreadable.
C. The mist lands on the sheet guide and causes an offset.

In the problems of the mist, similar to the problems of the wind ripple, since the airflow is a dominant factor, clarifying the changes of the airflow in the printer apparatus is a priority.

Here, the condition for the satellite to float is analyzed using the Stokes equation. It is believed that, when the weight of the satellite and the viscose resistance of air are the same, the acceleration toward the medium becomes zero, and thus, the satellite floats. Those occurrences are expressed by Expressions (2-18) to (2-20).

$$mg = 6\pi\eta r V_m \qquad (2\text{-}18)$$

$$mg = \frac{m}{\rho}\rho g = \frac{4}{3}\pi r^3 \rho = 6\pi r \eta V_m \qquad (2\text{-}19)$$

$$\frac{4}{3}\pi r^2 \rho = 6\pi \eta V_m \qquad (2\text{-}20)$$

Since $6\pi\eta$ is a constant, from Expression (2-20), it can be understood that the condition for the floating of the ink drop is determined by r and Vm. When Vm and the radius of the ink drop are small, mist is easily formed. In addition, since Expressions described above can be applied to the movement of the satellite having a small particle diameter in the floating field, the smaller the diameter of the satellite is and the lower the speed Vm is, the more easily the satellite is to be influenced by the airflow. Thus, it is believed that the possibility of occurrence of the deviation in landing becomes high.

Chapter 3. Introduction to Wind Ripple Phenomenon and Qualitative Analysis of Wind Ripple In this chapter, parameters that affect the wind ripple will be extracted and qualitatively analyzed, and then the conditions by which the wind ripple phenomenon is formed will be studied based on the analysis result.

3-1. Outline of Wind Ripple 3-1-1. What is Wind Ripple?

The original meaning of wind ripple is a pattern of sand when wind is blowing on the sand. However, in the area of ink jet printers, it means a specific pattern formed on the medium by the changes of airflow around the head due to the movement of the carriage of the printer, and the changes of the flight trajectory of the ink drop (satellite) discharged from the printer head.

3-1-2. Risk of Wind Ripple

Regarding the relationship between the wind ripple and the image quality, in the printing through the driver, since the duty is high and the ink drop is almost filled solid, and thus in many cases, there has been less influence on the image quality. However, PPI/Bix-based ink, or the like is difficult to spread on the medium, and in a case where a discharge weight of the head has less margin, there has been a case where the wind ripple pattern can be seen with the naked eye when the high speed driver printing or the printing with the large PG is performed.

3-1-3. Typical Wind Ripple Pattern

A. Wind Ripple Due to the Deviation in Landing of the Satellite

Figure 13:
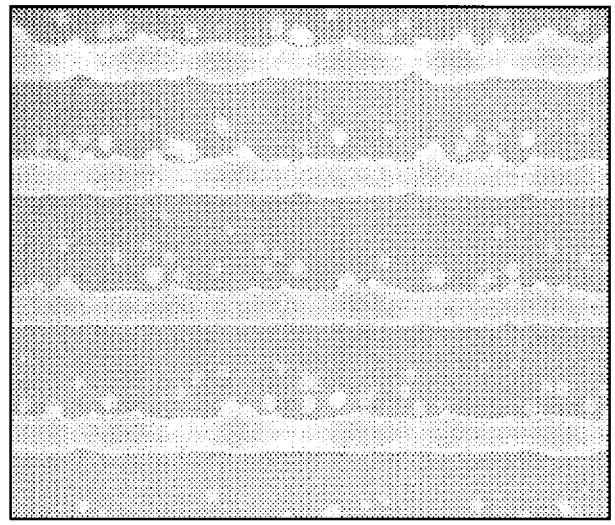
FIG. 13 illustrates the deviation in landing of the satellite.

As illustrated in FIG. 3-1 (FIG. 13), the satellites land between the lines formed from the main dots, and form the wind ripple patterns.

B. Wind Ripple Due to the Bending of the Lines Formed of the Main Dots

Figure 14:
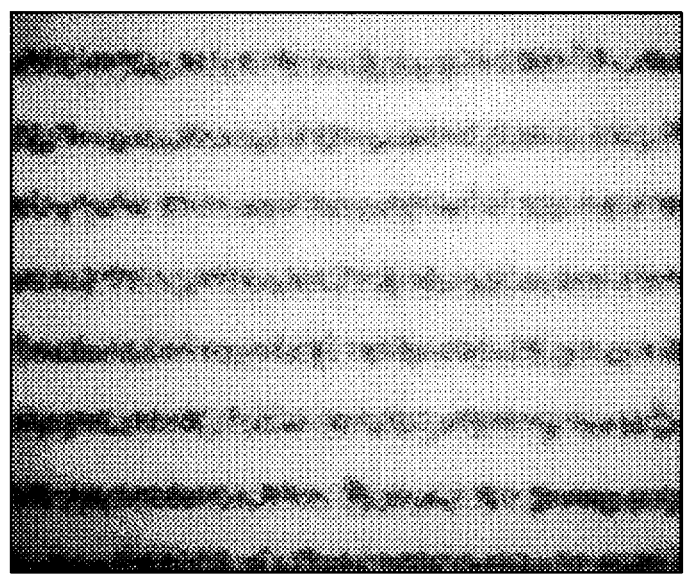
FIG. 14 illustrates a bending of the main dot.

As illustrated in FIG. 3-2 (FIG. 14), the wind ripple is formed due to the bending of the lines formed of the main dots.

3-1-4. Challenges for Clarifying Cause of Wind Ripple Phenomenon

Considering the reason why the wind ripple is formed based on the wind ripple phenomenon, air is flown into the gap (PG) between the sheet and the head by the movement of the carriage, and the satellites discharged from the nozzle are affected by the airflow and land between the lines formed of the main dots, and then forms the wind ripple patterns.

However, the above interpretation is not sufficient, and it is considered that there are problems described below. The problems will be described using the experimental analysis and the numerical simulation.

A. Since the airflow caused by the movement of the carriage blows in a main scanning direction of the head, and the deviation in landing of the satellite is in an orthogonal direction thereof, it is not possible to explain the wind ripple phenomenon as long as there exists another airflow or a vortex is not formed. It is necessary to prove that there exists the airflow in the direction of the deviation in landing of the satellite.

B. It is necessary to prove that whether the reason for the bending of the ink dot being formed is the same as the reason for the deviation in landing of the satellite, or other reasons exist.

C. Whether the reason for the wind ripple occurring is only the airflow or not, and what is the relationship between the wind ripple and the characteristics of the ink discharge.

3-2. Qualitative Analysis of Parameters that Affect Wind Ripple

In order to clarify the reason for the wind ripple being formed, the easiest way is to obtain the wind ripple from the phenomenon, and select the parameters that may affect the wind ripple, and then qualitatively analyze which influences are affected with respect to the wind ripple. Through an experiment of changing the parameters that affect the wind ripple, the influences by the changes of the parameters to the wind ripple can be seen. Therefore, it is possible to investigate the relationship between the wind ripple and the airflow from the results of estimating the parameters.

In order to qualitatively evaluate the wind ripple pattern, as illustrated in Table 3-1 (FIG. 15), an evaluation standard is made.

3-2-1. Relationship between PG and Wind Ripple

As illustrated in Table 3-2 (FIG. 16), there is a tendency that the wind ripple is remarkable as PG increases. Taking this result into account, the satellite can land on the medium in a short time by making PG small, then, the influence from the airflow decreases, and thus the deviation in landing decreases. The deviation also depends upon other factors such as the types of the printing apparatus and Vm, but if PG is equal to or less than a certain value, the deviation of the satellite is no longer visible, and then the wind ripple phenomenon cannot be seen. However, in order to solve the wind ripple problem, the method of making PG small, but there may be a risk of an occurrence of sheet rubbing or the like. Therefore, it is necessary to consider the balance of both factors.

3-2-2. Relationship between Ink Discharge Speed, Weight, Print Mode, and Wind Ripple Considering the relationship between the wind ripple and the ink discharge speed Vm, if Vm is smaller, it takes a shorter time from the discharge to land, and the influence by the airflow becomes small, thus the conclusion that the wind ripple becomes difficult to appear may be derived. However, the actual result is contrary to this. The actual result is that, if the ink speed is high, the wind ripple is prominent. In addition, it was found, from the printing experiments and the ink flight experiments in the bench, that the wind ripple phenomenon not only depends simply upon the ink discharge speed but also depends upon the drive waveform mode, the weight of the ink.

Figure 17:
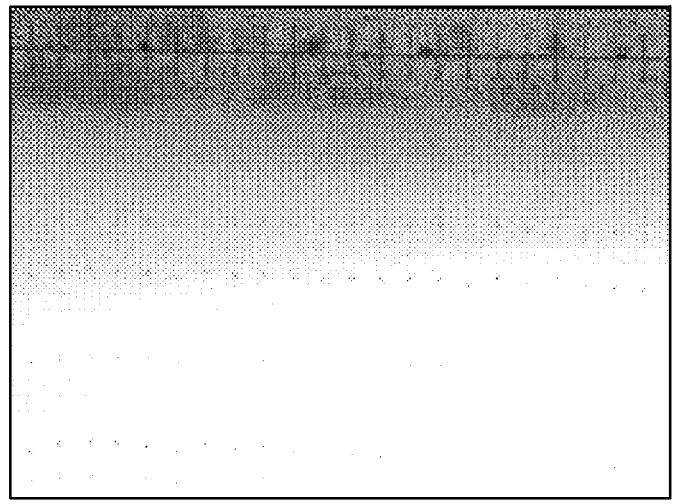
FIG. 17 illustrates a flight state of the ink drop.
Figure 18:
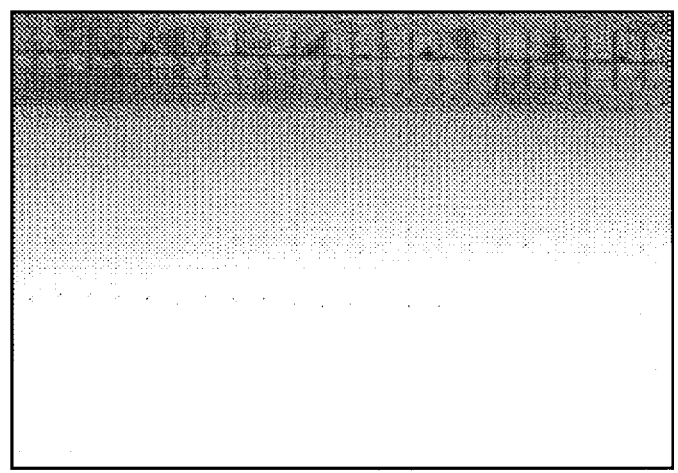
FIG. 18 illustrates a flight state of the ink drop.

FIG. 3-3 (FIG. 17) and FIG. 3-4 (FIG. 18) are pictures that illustrate the flight state of the ink drop. Comparing the flight state of ink drops in two pictures, the satellite in which the ink drop discharge speed Vm is lower is deformed. It can be understood that the ink discharge speed affects a large influence on the flight state of the satellite.

Figures 19, 20:
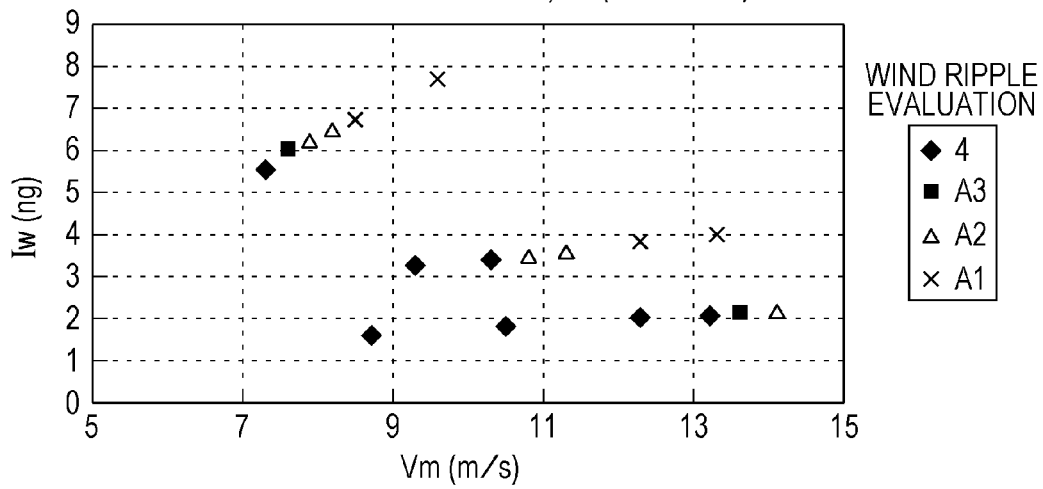
FIG. 19 illustrates a relativity of the wind ripple, Vm, and Iw.
FIG. 20 illustrates a relationship between the wind ripple, Vm, Iw, and print mode.

FIG. 3-5 (FIG. 19) is a diagram illustrating the relationship (Clio-VSD3) between the wind ripple and Vm, Iw. FIG. 3-3 (FIG. 20) is a table illustrating the relationship between the wind ripple and the ink discharge speed, weight of the ink, and the print mode. It can be understood that the condition of Vm for an occurrence of the wind ripple also depends upon the print mode and the weight of ink.

3-2-3. Relationship between Carriage Speed and Wind Ripple

It is believed that the airflow due to the movement of the carriage is the first condition for forming the wind ripple pattern. In addition, it is also known that the carriage speed depends upon the print mode. The relationship between the carriage speed and wind ripple is investigated and the result thereof is illustrated in Table 3-4 (FIG. 21). Since the comparison is performed in the different print mode, it cannot be generally said that the wind ripple becomes prominent with the carriage speed increases. However, it is true that, when the ink with the same weight is discharged, the wind ripple easily appears in the print mode in which the carriage speed is high.

3-2-4. Relation Between the Print Duty and the Wind Ripple

A. Relationship Between the Drive Frequency of the Waveform and the Wind Ripple

As illustrated in Table 3-5 (FIG. 22), the wind ripple phenomenon was not seen by decreasing the drive frequency of the waveform. From this result, it can be understood that the wind ripple phenomenon depends upon the drive frequency of the waveform.

B. Relationship Between the Number of Driving Nozzles and the Wind Ripple

From Table 3-6 (FIG. 23), it can be understood that more than a certain number of nozzles that simultaneously drive (in this experiment, thirty nozzles) are necessary for forming the wind ripple phenomenon. Since the forming of the wind ripple is due to the airflow, it can be estimated that the airflow (in a direction of ink discharge) around the ink drop depends upon the number of ink drops discharged at the same time.

In addition, as illustrated in FIG. 3-7 (FIG. 24), it can be understood that, when the gap between the driving nozzles becomes wider, the wind ripple phenomenon is not seen. Incidentally, 95% means that 180×95%=171 nozzles among 180 nozzles are used in experiment, and the nozzles that was not used are #1, #21, #41, . . . #161 (gaps are the same).

The description below can be estimated by the result of Table 3-7 (FIG. 24). Since the non-driving nozzles exist in the array, the gap between the nozzles becomes wide in a certain interval, the airflow concentrates to the position where the interval is wide, then the wind penetrates between the driving nozzles that are considered to be the cause of forming the wind ripple pattern, thus the wind ripple becomes difficult to be formed. Therefore, it can be understood that, when the gap of the nozzles simultaneously drive in the array, there is a tendency that the wind ripple is difficult to be formed.

3-2-5. Influence on Wind Ripple by Simultaneous Driving of Two Columns of Nozzles In recent years, in order to obtain a high resolution and high print speed, a printing apparatus in which the printing is performed by two columns of nozzles driving simultaneously is increased. The wind ripple pattern was compared in a case where two columns of nozzles drive simultaneously and a case where only one column of nozzles drive. The result showed that the wind ripple phenomenon is prominent in a case where the two columns of nozzles drive simultaneously. From this result, it can be understood that the flight state of the ink drop in a certain column of nozzles is influenced by the discharge of ink drops by the driving of another column of nozzles. The influence was investigated with regard to the distance between the adjacent columns, and the dot size of the discharged ink drop. The result is illustrated in Table 3-8 (FIG. 25) and Table 3-9 (FIG. 26). According to the Tables, when the ink is discharged from the two columns of nozzles simultaneously, the prominence of the wind ripple phenomenon varies based on the drive condition. In particular, when the gap of the two columns of nozzles that drive simultaneously becomes narrow or when the dot size of the adjacently discharged ink drop is large, there is a tendency that the wind ripple phenomenon becomes prominent. Here, it is particularly noted that, when the large dot is discharged from column B, with regard to the wind ripple pattern in the adjacent column A, not only the deviation in landing of the satellite but also the bending of the main dot was observed.

Figure 27:
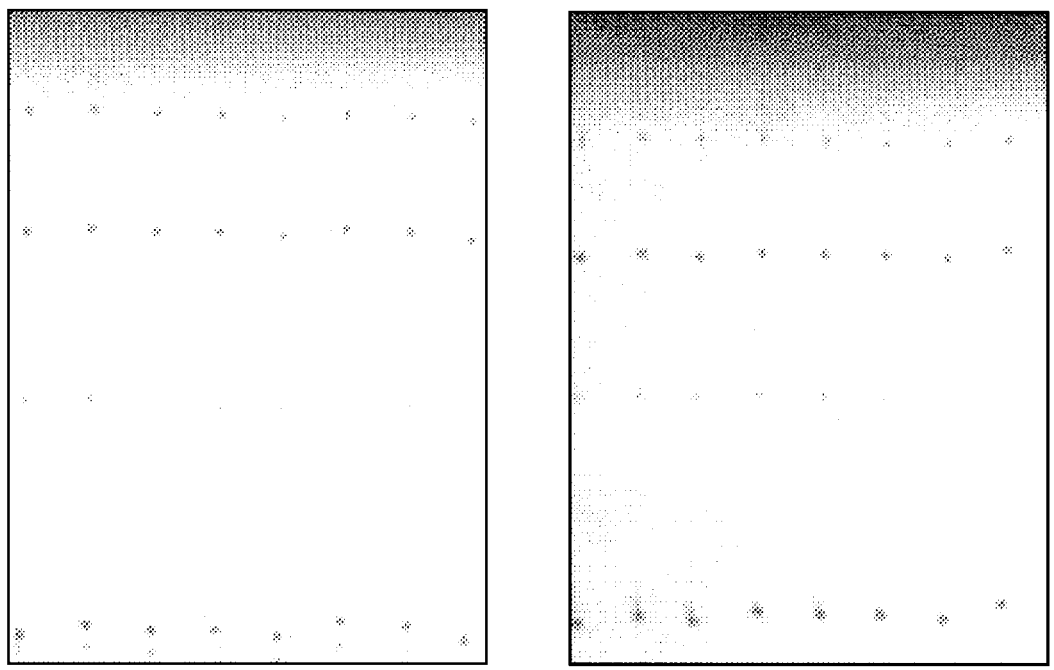
FIG. 27 illustrates a comparison (VSD1S, column B) of a flight state of an ink drop (satellite) (left: adjacent column A is not driven; right: adjacent column A VSD1L).
Figure 28:
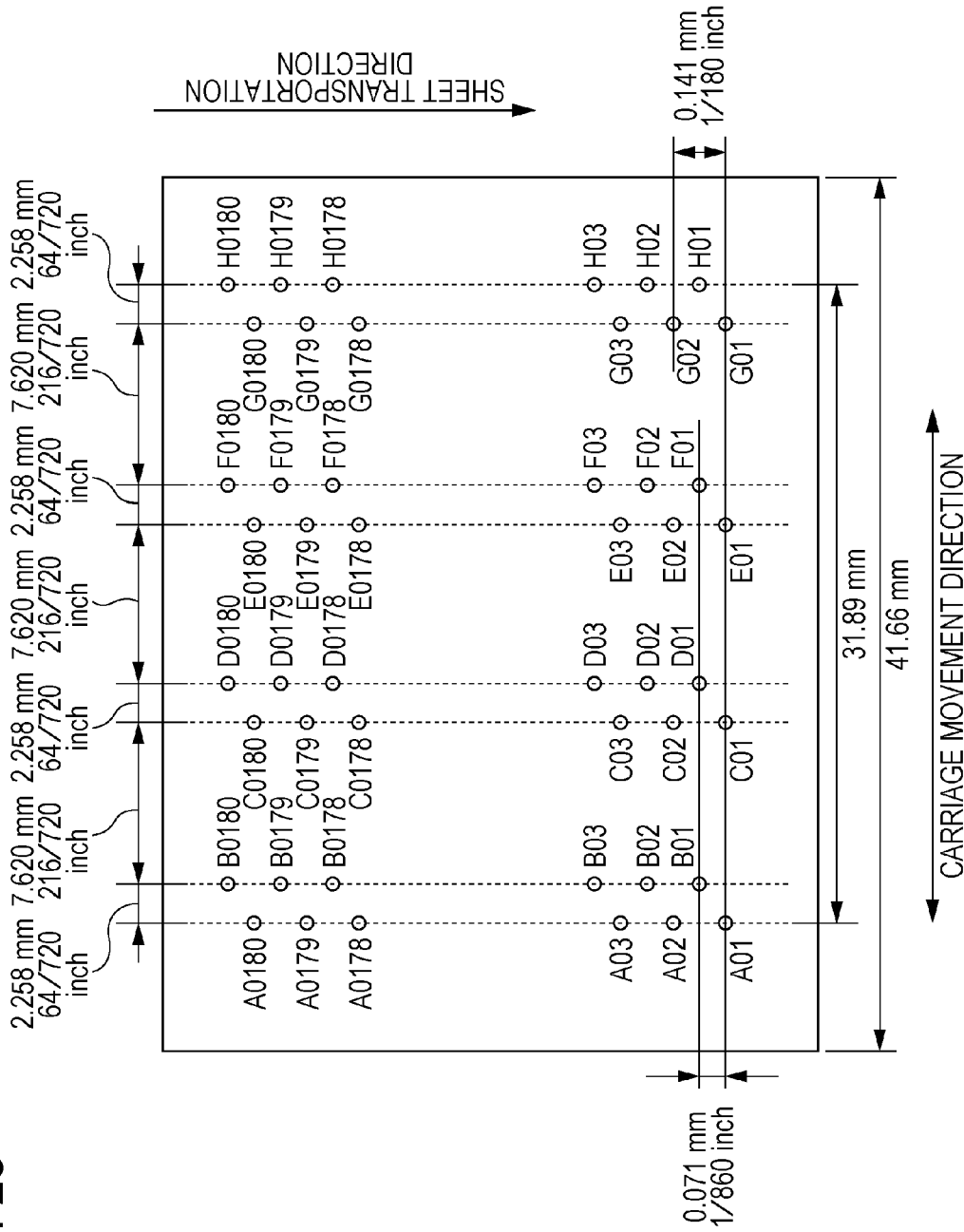
FIG. 28 is a diagram of an array of nozzles.

Regarding the result described above, the study is performed in two ways: the characteristics of the ink discharge and the influence from the airflow. FIG. 3-6 (FIG. 27) is a picture on the bench illustrating the flight state of the ink. When the large dot is discharged from column A, a tailing phenomenon of the satellite of the adjacent column B was seen. When the printing is performed by the printer, since the airflow is present toward the direction vertical to the ink discharge direction, it is considered that the satellite which is in tailing forms a sub-satellite having a small diameter by receiving the influence of the airflow. The sub-satellite turns into mist, and floats in the apparatus or lands on the medium to become the wind ripple pattern. In addition, considering the factor of airflow due to the carriage, there is no doubt that the airflow is influenced by the large dots discharged from the column A. The degree of the influence also depends on the dot size of the discharged ink and the distance to the adjacent column. FIG. 3-7 (FIG. 28) is a diagram of the array of nozzles.

3-2-6. Influence on Wind Ripple by Uni-D and Bi-D

When the printing is performed in Uni-D (one direction) and in Bi-D (bi-directional) under the same condition, the wind ripple patterns are compared. The obtained wind ripple patterns in the forward path and the backward path were found to be different from each other. The reason for this is considered in two points as follows.

A. Since the right and left shapes of the carriage is different, the airflow is changed by an influence of such shape, thus the wind ripples having different shapes in forward path and backward path are formed.

B. When the printing is performed Bi-directional, if the carriage is moving toward the home side from the 80 digit side, the airflow such as backflow is generated, a different wind ripple pattern is formed in the backward path and the forward path due to the influence of such airflow.

3-2-7. Influence on Rind Ripple by Opening and Closing Cover

When the printing is performed with the cover open and closed under the same drive conditions, by taking two sheets of printed samples and comparing them, two different wind ripple shapes were obtained. It is considered that the airflow in the printer apparatus is changed when the cover is opened and closed, and the influence thereof also affects the PG portion. When studying the wind ripple problem based on this result, it was found that it is desirable to check not only the airflow in the PG portion but also all of the airflow in the printer apparatus. In addition, a conclusion can also be obtained, in which the wind ripple phenomenon can be suppressed by causing the airflow to be changed by changing the shape of the components in the printer apparatus.

3-3. Wind Ripple Beginning Position 3-3-1. Wind Ripple Beginning Position

The experiment regarding the wind ripple beginning position was performed. The wind ripple beginning position is positioned regardless of the printing position and the movement direction of the carriage. The wind ripple does not begin to occur immediately after the start of the printing, but begins to occur after about 0.5 cm to 2 cm of printing. The reason was estimated as follows. The forming of the wind ripple needs the airflow formed in the ink discharge direction. In addition, if the airflow is stable, the wind ripple is not formed. Time is required to make the airflow stable. For this reason, the wind ripple cannot be formed immediately after the printing starts, and is formed after about 0.5 cm to 2 cm of printing.

3-3-2. Deviation in Landing of Satellite at Wind Ripple Beginning Position

Figure 29:
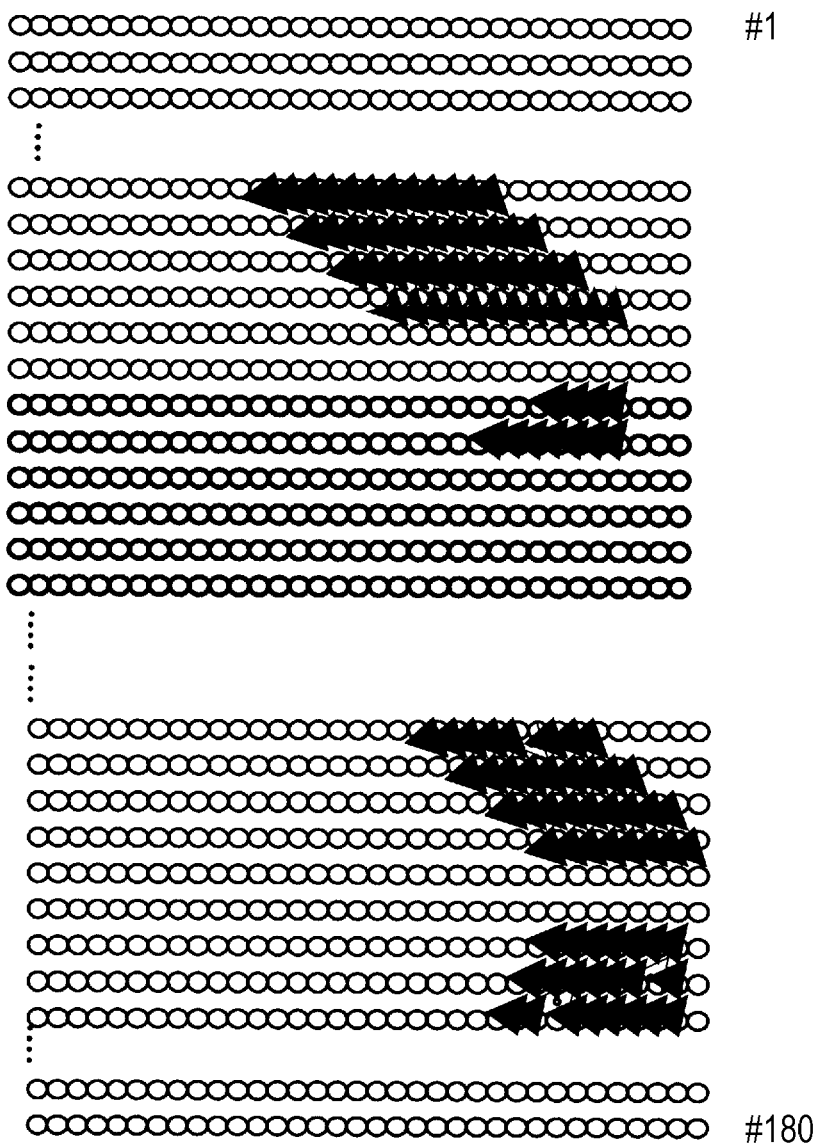
FIG. 29 is a diagram illustrating a deviation in landing of the satellite at the position where the wind ripple begins (model diagram).

In order to check the direction of airflow at the wind ripple beginning position, the deviation in landing between the main dots of the satellite was investigated. FIG. 3-9 (FIG. 29) is the result thereof.

3-4. Conditions for Forming the Wind Ripple

By observing an actual printing result and the flight state of the ink on the bench, the conditions for forming the wind ripple is summarized. Two conditions are necessary for forming the wind ripple. One is the forming of the satellite and the other is the airflow that causes the deviation in landing of the satellite. The airflow that causes the deviation in landing of the satellite is formed of two kinds of flows. The two kinds of flows refer to the flow due to the movement of the carriage and the flow due to the ink discharge.

The parameters that influence the forming of the satellite and the airflow will be studied.

A. Forming of the Satellite

The forming of the satellite depends upon the parameters such as the ink discharge speed, the waveform, the properties of the ink (viscosity, surface tension), and the shape of the nozzles. In this experiment, only Vm and the factor of the waveform were examined. It was found that the higher Vm is, the more easily the satellite is formed, and more easily deformed than the perfect circle. However, even in the same Vm, if the waveform mode is different, the forming of the satellite changes.

B. Forming of the Airflow in the Ink Discharge Direction

The forming of the airflow in the ink discharge direction depends upon the nozzle density, the number of nozzles that simultaneously drive, and the diameter of the discharged ink drop. If the nozzle density is higher and the number of nozzles that simultaneously drive is more and the diameter of the discharged ink drop is larger, then the airflow in the ink discharge direction is more easily formed and the effect thereof becomes prominent.

C. Airflow Due to the Movement of the Carriage

The airflow due to the movement of the carriage depends upon the carriage speed and the shape of the carriage. If the carriage speed is higher, the effect of the airflow becomes larger.

Chapter 4. Numerical Analysis Simulation of Wind Ripple Phenomenon

In this chapter, the result of the numerical simulation of the wind ripple will be described and the consistency with the experimental result will be examined.

4-1. Numerical Analysis Simulation of Wind Ripple Phenomenon 4-1-1. Purpose of Numerical Simulation of Wind Ripple The purpose of the numerical simulation is to investigate the changes of flight states of the ink in the field of ink drop's flow and the deviation in landing of the satellite in the nozzle array direction and the changes of the airflow which causes the wind ripple, using the Mass Particle function included in the fluid analysis software "FLOW 3D".

4-1-2. Outline of Numerical Simulation of Wind Ripple

A. Analysis Region

Figures 30, 31:
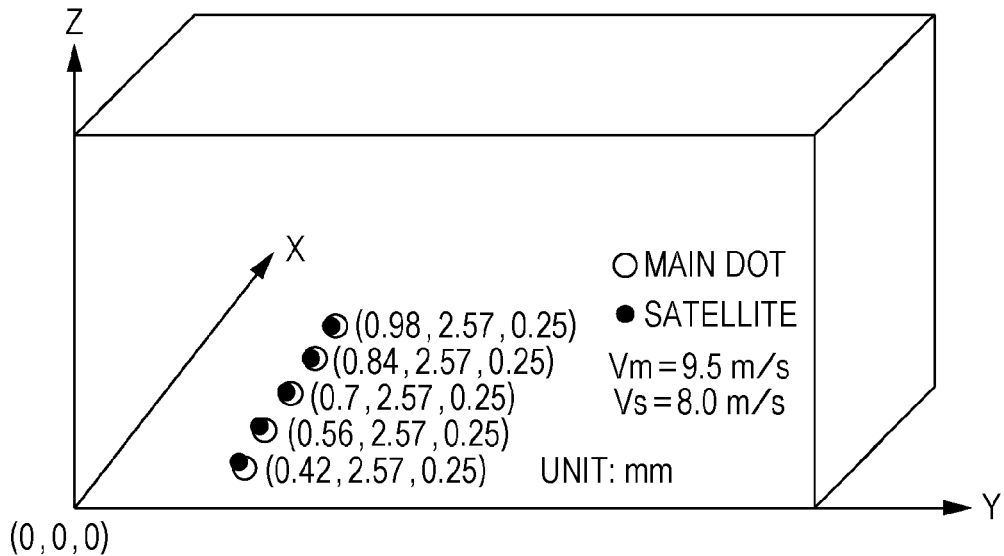
FIG. 30 is a diagram of a numerical analysis simulation model of the wind ripple.
FIG. 31 is a diagram illustrating an initial condition of the numerical analysis simulation of the wind ripple.

As illustrated in FIG. 4-1 (FIG. 30), the nozzle analysis region is the bottom surface, and the position where the main dot and the satellite are formed is the position 0.25 mm away from the bottom surface. The main dot and the satellite are discharged toward the z axis. In the analysis region, the height is 1.7 mm (corresponding to PG), the depth is 1.4 mm, and the width is 7.0 mm. A cell for analyzing is a cubic having a dimension of uniformly 20 μm in each direction. The duration for simulation is set to 100 ms.

B. Condition for Analysis

As illustrated in Table 4-1 (FIG. 31), the simulation was performed under four conditions.

C. Boundary Condition for Simulation

Operation surface: the constant airflow of 0.6 m/s corresponding to the movement carriage speed is flowing in the Y axis direction Depth side: pressure gradient zero Right and left surface: pressure gradient zero Bottom surface (nozzle surface): wall surface boundary speed zero Upper surface: wall surface boundary speed 0.6 m/s (expresses the movement of the carriage)

Figure 32:
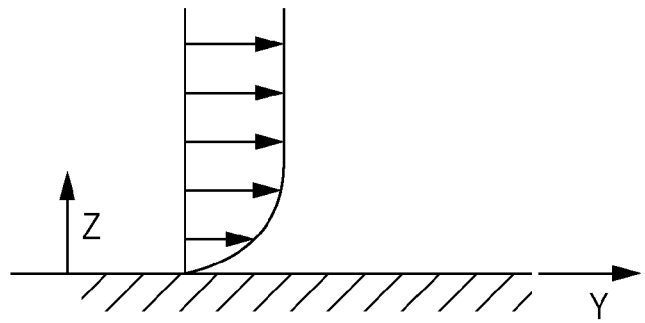
FIG. 32 is a diagram illustrating a boundary condition of the airflow.

FIG. 4-2 (FIG. 32) illustrates the boundary condition of the airflow.

D. Physical Properties

Density of the ink: 1.048 g/cm$^3$

Density of air: 1.225×10$^{-3}$ g/cm$^3$

Air viscosity coefficient: 1.781×10$^{-4}$ g/cm·s

E. Evaluation Items

Figure 33:
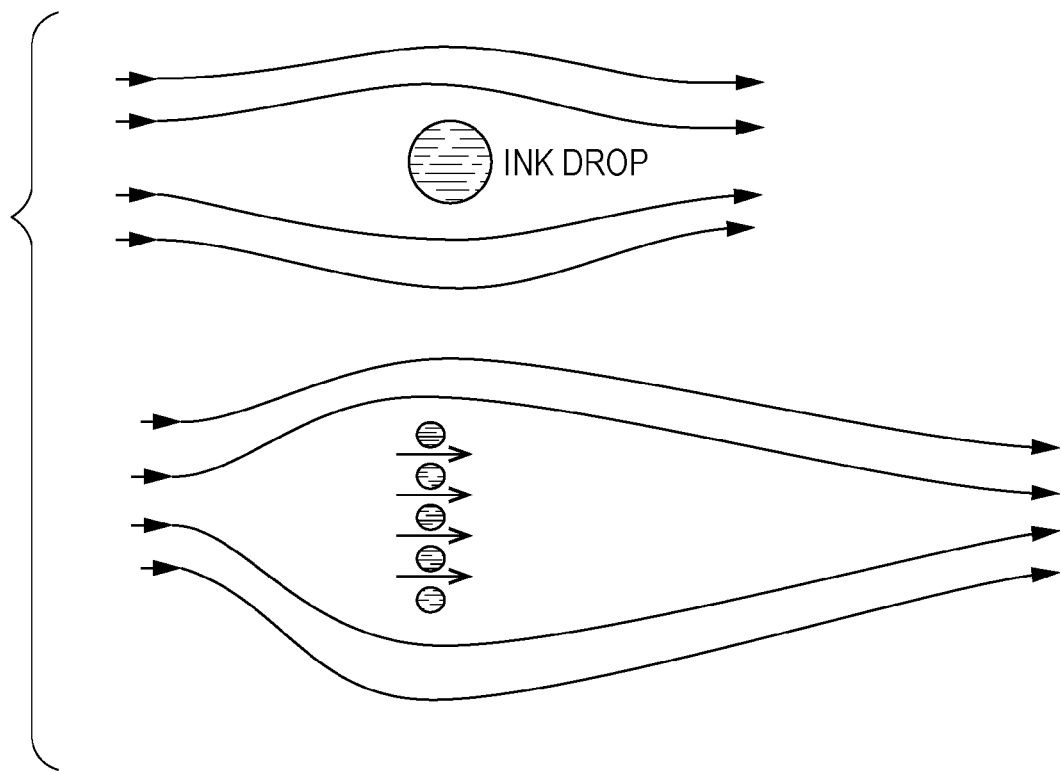
FIG. 33 is a diagram illustrating an airflow toward the +Y axis direction.

1. Evaluation by the change of speed and direction vector of the airflow
2. Flight tracking of the main dot and the satellite and deviation in landing in the nozzle direction 4-1-3. Result of the Numerical Simulation of the Wind Ripple FIG. 4-3 (FIG. 33) illustrates the airflow in the +Y axis direction.

Figure 34:
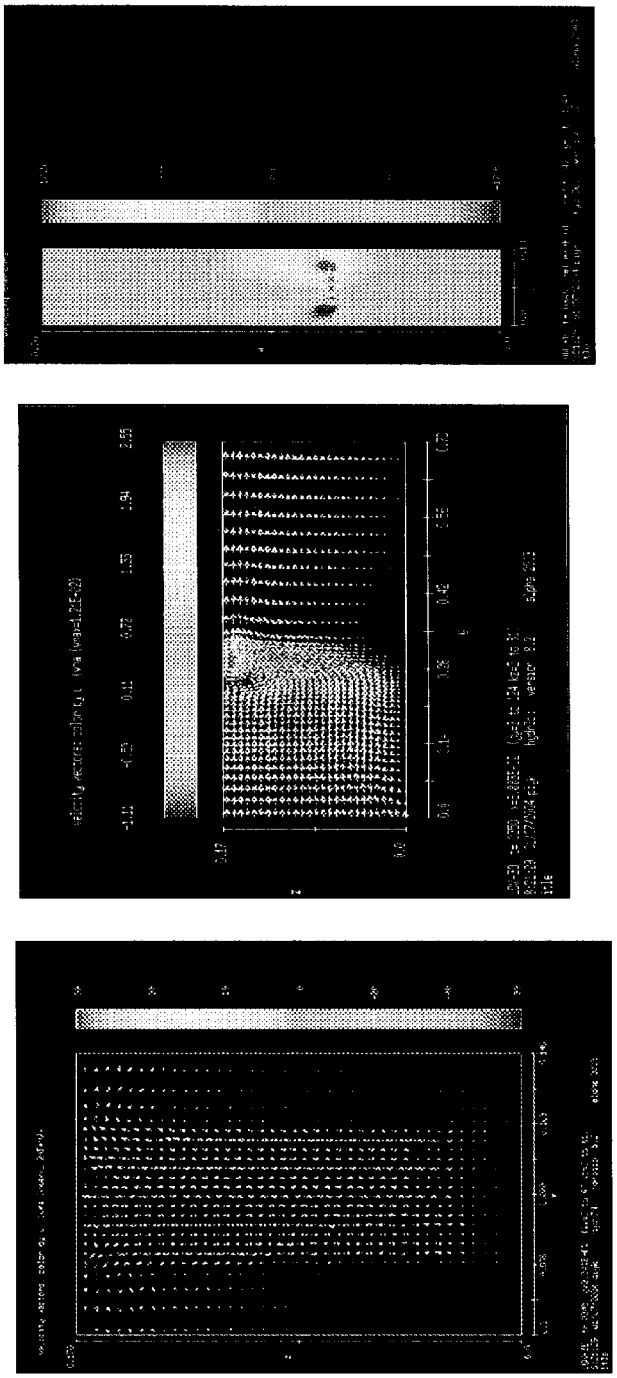
FIG. 34 is a diagram illustrating a speed distribution of the airflow.
Figure 35:
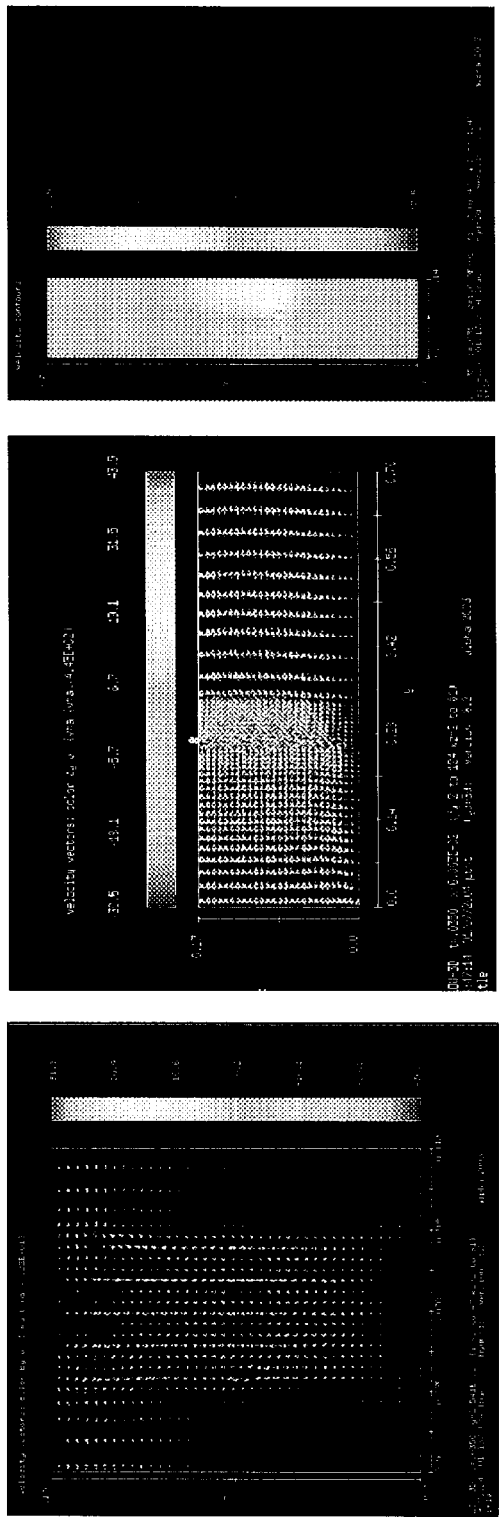
FIG. 35 is a diagram illustrating a speed distribution of the airflow.
Figure 36:
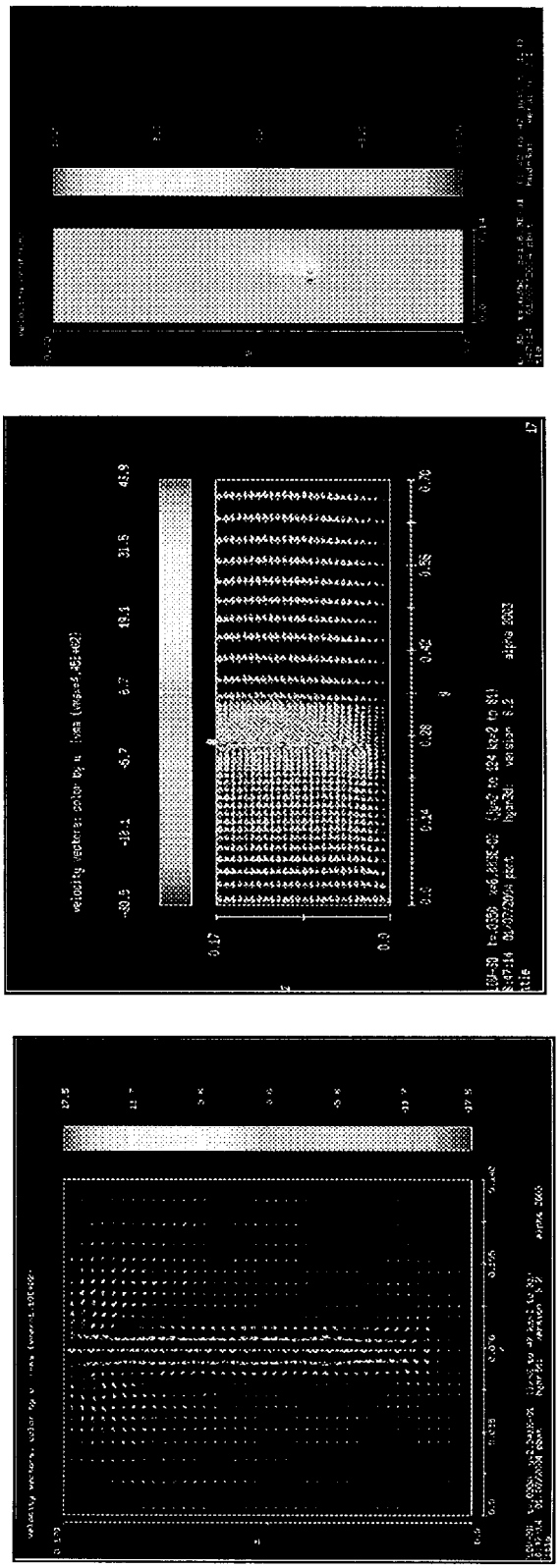
FIG. 36 is a diagram illustrating a speed distribution of the airflow.

FIG. 4-4 (FIG. 34), FIG. 4-5 (FIG. 35), and FIG. 4-6 (FIG. 36) illustrate the result of the simulation numerical analysis that indicates the changes of the airflow under the simulation conditions II, III, and I. The left, middle, and right pictures illustrate the changes of the airflow seen from a view point on the X-Z surface, Y-Z surface, and X-Y surface respectively.

A. Relationship Between the Drive Frequency and the Number of Nozzles, and the Movement Direction of the Carriage (Y Axis Direction)

Regarding the relationship between the number of driving nozzles and the airflow, in both of the one nozzle model and five nozzle model, the wind blowing toward +Y axis direction showed a tendency of going around the ink drop and returning to the normal state at the back side of the ink drop. From the result of the simulation, it can be understood that the distance for returning to the normal state is larger in the five nozzle model than that of the one nozzle model (refer to the right pictures in FIG. 4-4 (FIG. 34) and FIG. 4-6 (FIG. 36)).

In addition, in the case of the five nozzle model, it can be read, from the result of the situation, that the airflow passing between the ink drops is small and the influence range is also small (refer to the right picture of FIG. 4-6 (FIG. 36)).

Summarizing the above results, there is a tendency that the distance between the ink drop and the position of the airflow which is subject to return to the normal state at the back side of the ink drop becomes larger by the increase in the number of nozzles. It can be understood that, when the distance reaches a certain length, the airflow at the back side of the ink drop becomes slow and an unbalance of the energy (a negative pressure due to the difference of the airflow) occurs (refer to the middle picture in FIG. 4-6 (FIG. 36)).

When the number of nozzles simultaneously driving increases, the tendency unbalance of the energy becomes large, if the number of nozzles reaches a certain extent, it is believed that the airflow toward the Y axis direction does not go around the left and right of the nozzle, but penetrates between the nozzles. The airflow penetrated between the nozzles (air curtain effect, refer to B for details) collides with the airflow generated by the flight of the ink drops in the Z axis direction and a part of the wind that flows toward the Y axis direction changes path, and then the airflow toward the X axis direction is formed. The deviation phenomenon in landing of the satellite occurs by this airflow toward the X axis. However, it is believed that this phenomenon also depends upon the number of nozzles that simultaneously drive, gaps between the nozzles, Vm of the ink, and the size of the ink.

Analyzing the result of the printing in the wind ripple analysis experiment with the result of simulation, in the printing experiment, if the gap between the nozzles that simultaneously drive is twice as large, the wind ripple phenomenon does not occur. It is believed that the reason is because, when the gaps between the nozzles become larger than a certain length, the airflow is changed to flow in the one nozzle model. In addition, from the result of the printing experiment, in order to form the wind ripple, it is required that 30 or more nozzles simultaneously drive. It means that a certain number of nozzles are required to simultaneously drive as a condition for the airflow to penetrate between the nozzles.

B. Relationship Between the Drive Frequency, the Number of Nozzles and the Airflow in the Ink Discharge Direction Comparing the results in FIG. 4-4 (FIG. 34) and FIG. 4-6 (FIG. 36), the only difference in the experiment condition is the discharge frequency of the ink drops. The condition in FIG. 4-4 (FIG. 34) is under the condition I, five nozzles at 14.4 KHz, and the condition in FIG. 4-6 (FIG. 36) is under the condition III, five nozzles at 28.8 KHz. In the case of the condition III in high frequency drive, it is understood that the speed gradient of the airflow arises at the back side of the nozzle which is discharging (picture in middle in FIG. 4-6 (FIG. 36)). That is, the unbalance of the airflow occurs. Since such a phenomenon is not shown in the condition II (FIG. 4-5 (FIG. 35)), it can be understood that the phenomenon becomes prominent by the increase of the number of nozzles and the drive frequency.

The left picture in FIG. 4-4 (FIG. 34) to FIG. 4-6 (FIG. 36) illustrates the changes of the airflow toward the Z axis. It is understood that the airflow such as an air curtain is formed toward the Z axis direction. The airflow such as an air curtain depends upon the drive frequency and the number of nozzles, and it can read, from the result of the simulation, that the airflow such as an air curtain increases by the increase of the drive frequency and the number of nozzles. Summarizing the above results, it can be said that, by the repeated discharge of the ink, the uniform airflow is induced, and then the airflow such as the air curtain is formed in the ink discharge direction.

C. Deviation in Landing of the Satellite Toward the X Axis

Figure 37:
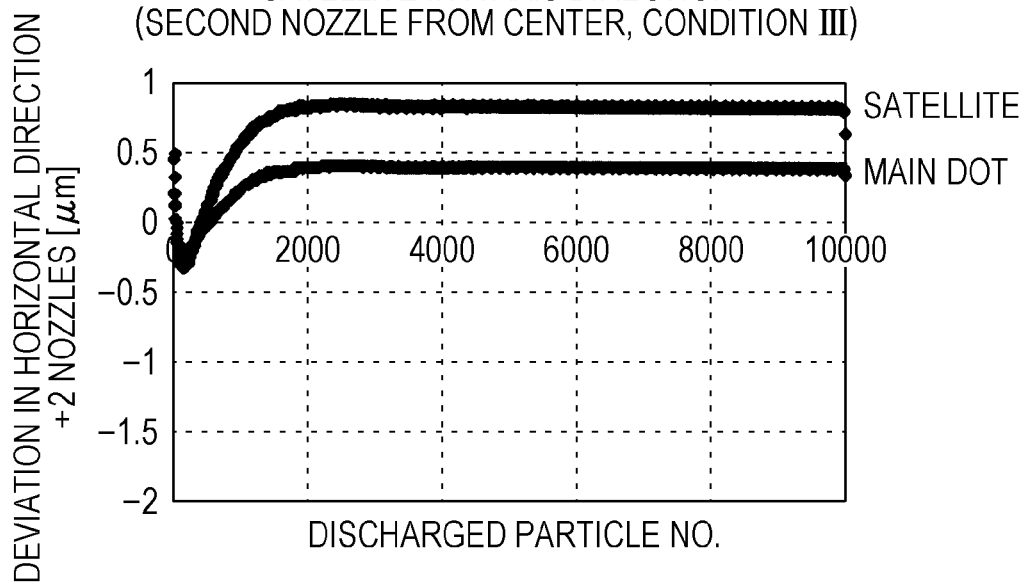
FIG. 37 is a diagram illustrating a deviation in landing of the satellite toward the X axis direction.
Figure 38:
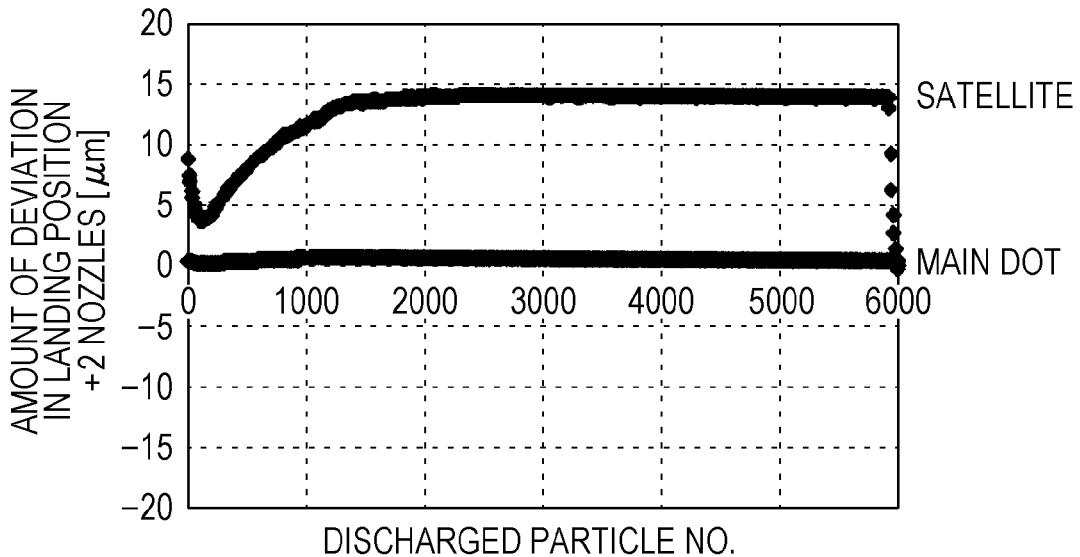
FIG. 38 is a diagram illustrating a deviation of landing of the satellite toward the X axis direction.

As a typical pattern of the wind ripple, there is a deviation in landing between the satellite and main dot. In the simulation experiment, the deviation in landing of the satellite toward the X axis was calculated. FIG. 4-7 (FIG. 37) and FIG. 4-8 (FIG. 38) illustrates the results of the deviation in landing toward the X axis under the conditions III and IV.

The deviation in landing toward the X axis under the conditions III and IV were respectively 0.4 μm and 14 μm. This result proves the existence of the airflow toward the X axis direction (nozzle array direction). In addition, by the comparison of the result under the two conditions, it can be understood that the factors that influences deviation in landing of the satellite toward the X axis are not only the airflow but also the diameter and the initial speed of the satellite. This phenomenon can be explained by the Stokes equation (refer to Expression 2-18 in Chapter 2).

4-2. Overview of Result of Numerical Value Simulation of Wind Ripple

A. The existence of the air curtain effect in which the uniform airflow is induced by the repeated discharge of the ink was proved. The effects depend upon the size, speed, and the frequency of the discharged ink.
B. The deviation phenomenon in landing of the satellite toward the X axis direction (nozzle array direction) that causes the wind ripple was observed. The deviation in landing is influenced by Vm and diameter of the satellite, the number of nozzles that simultaneously drive and the frequency.

4-3. Assumption on Forming of Wind Ripple

An assumption on the forming of the wind ripple is established based on the result of the experimental analysis and the result of the numerical simulation.
A. The deviation in landing of the satellite in the TA direction (nozzle array direction) is caused by the airflow. The airflow is generated by the interaction of the airflow due to movement of the carriage and the airflow due to the ink discharge.
B. The bending of the main dot is seen well when the two adjacent nozzle columns simultaneously drive. The reason is because the flight state of the ink drop having a light weight and the satellite thereof becomes unstable due to the simultaneous driving of two adjacent nozzles, and thus, the ink drop and the satellite are easily influenced by the airflow. In addition, the forming of the airflow here is the same as that in assumption A.
C. The forming of the wind ripple also depends upon the discharge characteristics of the head. The wind ripple phenomenon is prominent when Vm is high, when the easy-to-be-deformed satellite is formed, and when the sub-satellite is formed.

Chapter 5. Observation of Airflow Inside Printer by PIV System

The experimental analysis and the numerical simulation are performed at the same time in order to clarify the wind ripple phenomenon. In performing the numerical simulation, accurate setting of the initial conditions is an important factor that determines the accurate conclusion. In order for this, the observation of the airflow inside the printer, particularly the observation of the airflow at the PG portion is essential. Since the PG portion is very narrow, it is said that the observation is difficult. In this experiment, the airflow inside the printer was performed using the PIV system. It is considered that observing inside the printer using the PIV system is really helpful not only to the wind ripple problem but also to solve the mist or dirt problem in the apparatus. A principle of the PIV system and an intermediate result of the experiment using the PIV system will be described in this chapter.

5-1. Outline and Principle of PIV (Particle Image Velocity) System

PIV (Particle Image Velocity, particle image flow velocity measuring method) is an advanced velocity measurement method in which particle images are captured at two time points separated by a small time interval using a CCD video camera and a pulse laser, and the particle images are analyzed, and then a local velocity of the group of particles is obtained. For example, in the cross correlation method, it is possible to estimate the moved distance of the group of particles, that is the velocity of the group of particles, by dividing each particle image into two small regions called correlation regions, and then obtaining the correlation peak of the group of particles (brightness value) between the two time points per each correlation region. It is possible to obtain the velocity distribution in all of the capturing regions by performing this process for all of the correlation regions.

Figure 39:
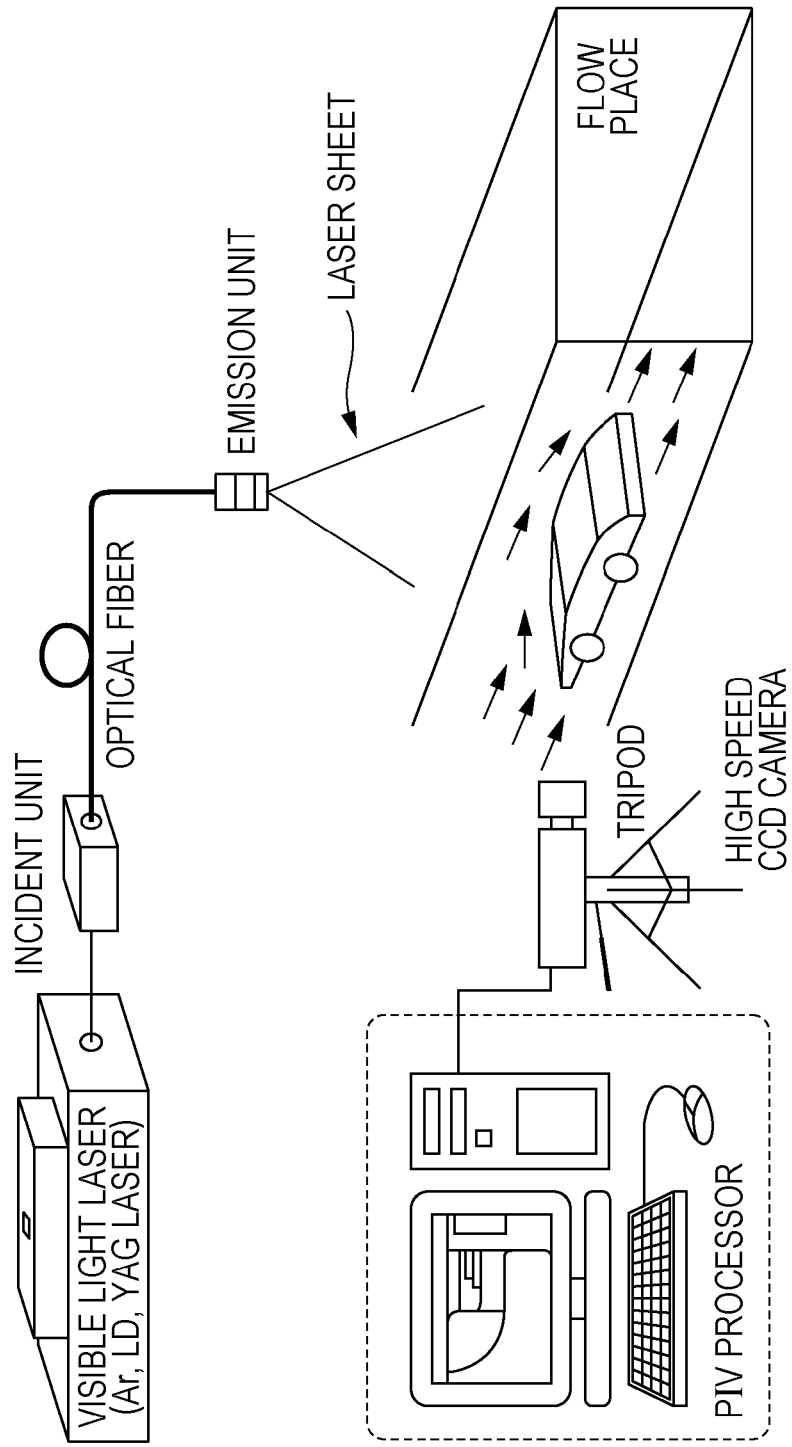
FIG. 39 is a schematic diagram of a PIV system.

As illustrated in FIG. 5-1 (FIG. 39), the PIV system is configured to include a laser light source that generates a light sheet, a particle tracer for imaging, a high speed camera for capturing the image, and an image processing software for calculating the wind direction and the wind speed.

Figure 40:
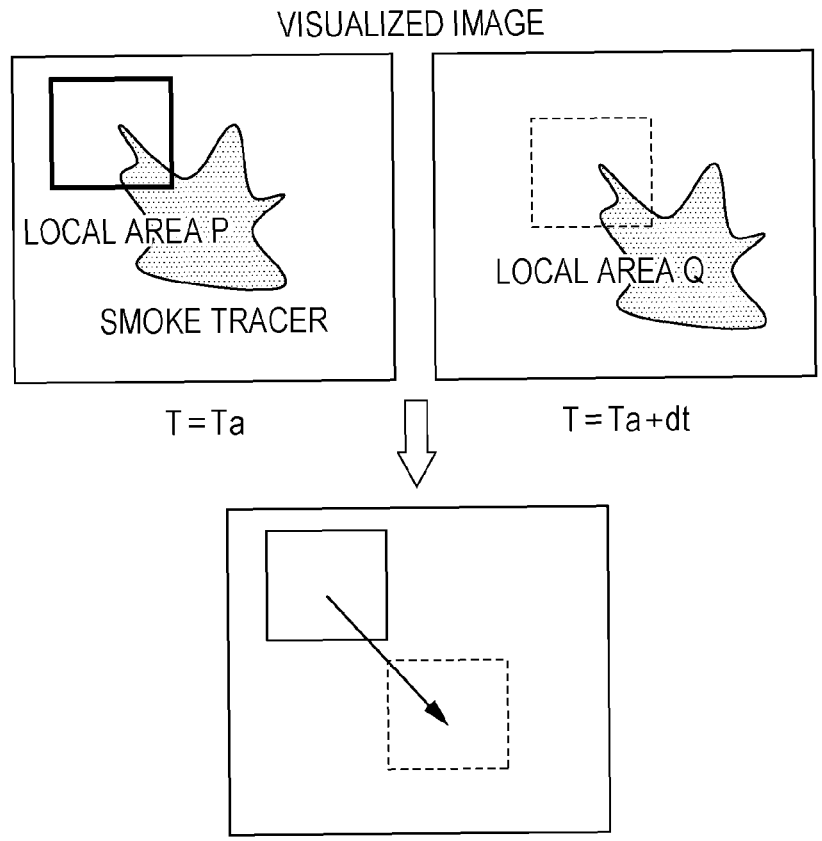
FIG. 40 is a diagram illustrating a calculation method in the PIV system.

The PIV system has characteristics as follows. FIG. 5-2 (FIG. 40) illustrates a calculation method in the PIV system.
A. Wind direction and wind speed on the entire surface of any surface can be measured.
B. Wide range from low speed to high speed can be measured.
C. Measurement accuracy depends upon the visible image (also depends on the time resolution of a camera and the performance of the laser).
D. Measurement in two dimensions or three dimensions is possible.

The following expression is a calculation formula.

$$\Sigma R_{PQ} = \Sigma_{i=0, j=0}^{i=n, j=m} \overline{(P_{ij} - Q_{ij})} \quad (2\text{-}21)$$

5-2. Measurement of Airflow in Printer by PIV System

Figure 41:
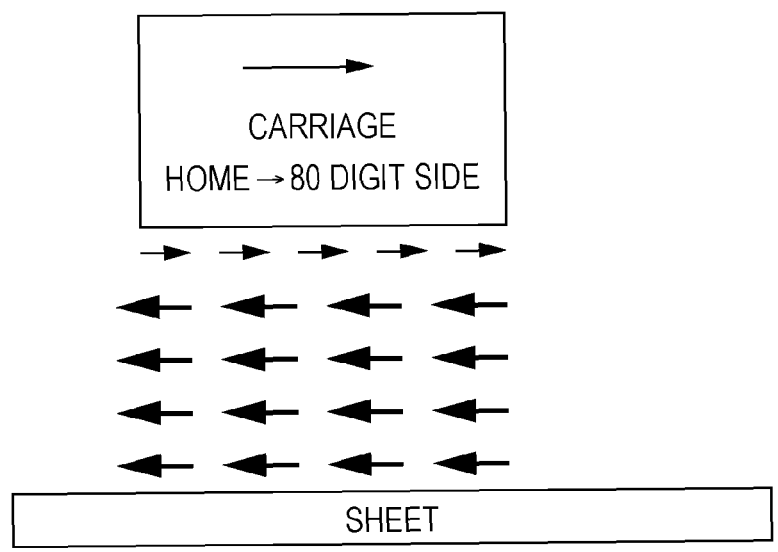
FIG. 41 is a diagram illustrating the airflow in a PG portion of the printer.

An experiment was performed using the PIV system.
FIG. 5-3 (FIG. 41) illustrates the airflow in the PG portion as a part of the measurement result. As illustrated in FIG. 5-3 (FIG. 41), it is seen that a reverse airflow is generated in the PG portion toward a direction opposite to the carriage movement direction. In addition, the airflow in the PG portion is almost a normal flow, and a vortex and turbulence are not observed.

5-3. Deployment from PIV Experiment

From the result of the experiment, there is a deployment such as the following.
A. From the result of the measurement by the PIV system, the airflow in the PG portion is quantified and is used as the initial condition for the numerical simulation of the wind ripple.
B. The flight state of the ink in the PG portion is observed using the PIV system.
C. Comparing the result of the PIV system and the result of the numerical simulation, the reliability of the wind ripple simulation is evaluated.

Chapter 6. Conclusion

6-1. Overview of Result of Experimental Analysis and Numerical Simulation

The following was revealed through the experimental analysis of the wind ripple and numerical simulation.
Parameters that Influence the Wind Ripple
A. PG: As the PG increases, the wind ripple becomes prominent.
B. Vm: The Vm condition in which the wind ripple occurs depends upon the print mode and the weight of the ink
C. CR speed: As the CR speed increases, the wind ripple becomes prominent.
D. Drive frequency: As the drive frequency increases, the wind ripple becomes prominent.
E. Nozzle gap in the head: As the nozzle gap decreases, the wind ripple becomes prominent.
F. Number of nozzles that simultaneously drive: As the number of nozzles that simultaneously drive increases, the wind ripple becomes prominent.
Conditions for Occurrence of the Wind Ripple
A. Airflow due to a movement of the carriage in a high speed (in the carriage movement direction)
B. Air curtain effect (in the PG direction) due to the discharge of the ink in high duty, through a number of nozzles simultaneously
C. Flight state of the ink drop (instability due to the high Vm, generation of the sub-satellite)

6-2. Measures for Suppression of Wind Ripple Phenomenon

Upon receiving the result of the experimental analysis and the result of the numerical simulation, the measures which are considered to be effective in suppressing the wind ripple phenomenon is summarized in Table 6-1 (FIG. 42).

C. Modification Example

The embodiment described above can be modified in various ways as follows.

C1. Modification Example 1

In the embodiment described above, as a processing of the conversion unit 104, the CPU of the printer 10 converts the multi-gradation data with reference to, depending on the print mode, the first table 111 illustrated in FIG. 2 and the second table 112 illustrated in FIG. 3 stored in the storage unit of the printer 10. In contrast, in the first print mode and the second print mode, the tables to be referenced may be different from those illustrated in FIG. 2 and FIG. 3 as long as the tables satisfies the following relationship.
In the first gradation reproduction region where only the small dot is used, the following relationship is satisfied.

The first gradation reproduction region of the first print mode>The first gradation reproduction region of the second print mode (1)

In the third gradation reproduction region where the small dot is not used, the following relationship is satisfied.

The third gradation reproduction region of the first print mode<The third gradation reproduction region of the second print mode (2)

C2. Modification Example 2

In the embodiment described above, in the first print mode, (B) the distance between the printing medium RM and the head unit 200 is set to be shorter than that of the second print mode, (C) the ink discharge speed is controlled to be lower than that of the second print mode, (D) the maximum relative movement speed between the head unit 200 and the printing medium RM per unit time is set to be lower than that of the second print mode, (E) the ink discharge frequency from the head unit 200 is controlled to be lower than that of the second print mode. In contrast, in the first print mode, not all of them may necessarily be controlled.

C3. Modification Example 3

In the embodiment described above, the printer 10 forms a dot having different types of sizes on the printing medium RM by changing the amount of the ink drop per each discharge. In contrast, the printer 10 may form a dot having different types of sizes on the printing medium RM by changing the number of the discharged ink drops. That is, the printer may be a printer that performs so-called multi-shot printing in which the number of liquid drops discharged to each image pixel is changed.

C4. Modification Example 4

In the embodiment described above, the printer 10 is a line head type ink jet printer. In contrast, the printer 10 may be a so-called serial head type printer in which the ink is discharged with the printing head being reciprocated along the width direction of the printing medium RM.

C5. Modification Example 5

In the embodiment described above, the ink discharge method in which the ink is discharged from the nozzle in the printing head 210 included in the printer 10 is due to the driving of the piezoelectric element. In contrast, various methods of ink discharge may be used, such as a thermal system in which a bubble is generated in the nozzle using the heat emitting element and the ink is discharged by the bubble.

The invention is not limited to the embodiment or modification examples described above, it can be realized by various other configurations without departing from the spirit of the invention. For example, the embodiment corresponding to the technical features in each aspect disclosed in the summary of the invention and the features of the modification example can be appropriately replaced or combined in order to solve a part or all of the problems described above or in order to achieve a part or all of the effects described above. In addition, any technical features that are not described as essential to the present specification can be, as appropriate, deleted.

The entire disclosure of Japanese Patent Application No. 2013-056204, filed Mar. 19, 2013 is expressly incorporated by reference herein.

What is claimed is:

1. A printing apparatus that includes a head unit which can form a plurality of dots of different sizes including a first dot and a second dot on a printing medium using an ink, the apparatus comprising:
   a first print mode having a plurality of gradation reproduction regions including a first gradation reproduction region of a first print mode which uses the first dot and does not use the second dot and a second gradation reproduction region of the first print mode which uses the first dot and the second dot; and
   a second print mode having a plurality of gradation reproduction regions including a first gradation reproduction region of a second print mode which uses the first dot and does not use the second dot and a second gradation reproduction region of the second print mode which uses the first dot and the second dot,
   wherein the first dot is smaller than the second dot,
   wherein a print speed in the first print mode is lower than a print speed in the second print mode, and
   wherein the first gradation reproduction region of the first print mode is larger than the first gradation reproduction region of the second print mode.

2. The printing apparatus according to claim 1,
   wherein the first print mode includes a third gradation reproduction region of the first print mode which does not use the first dot and uses the second dot,
   wherein the second print mode includes a third gradation reproduction region of the second print mode which does not use the first dot and uses the second dot, and
   wherein the third gradation reproduction region of the first print mode is smaller than the third gradation reproduction region of the second print mode.

3. The printing apparatus according to claim 1,
   wherein a distance between the printing medium and the head unit in the first print mode is shorter than a distance between the printing medium and the head unit in the second print mode.

4. The printing apparatus according to claim 1,
   wherein a discharge speed of the first dot in the first print mode is lower than a discharge speed of the first dot in the second print mode.

5. The printing apparatus according to claim 1,
   wherein a maximum relative movement speed between the printing medium and the head unit per unit time in the first print mode is lower than a maximum relative movement speed between the printing medium and the head unit per unit time in the second print mode.

6. The printing apparatus according to claim 1,
   wherein an ink discharge frequency from the head unit in the first print mode is lower than an ink discharge frequency from the head unit in the second print mode.

7. A printing method in which a plurality of dots of different sizes including a first dot and a second dot can be formed on a printing medium using an ink, the method comprising:
   performing the printing by
   a first print mode having a plurality of gradation reproduction regions including a first gradation reproduction region of a first print mode which uses the first dot and does not use the second dot and a second gradation reproduction region of the first print mode which uses the first dot and the second dot, and
   a second print mode having a plurality of gradation reproduction regions including a first gradation reproduction region of a second print mode which uses the first dot and does not use the second dot and a second gradation reproduction region of the second print mode which uses the first dot and the second dot,
   wherein, in the performing of the printing,
   the first dot is smaller than the second dot,
   a print speed in the first print mode is lower than a print speed in the second print mode, and
   the first gradation reproduction region of the first print mode is larger than the first gradation reproduction region of the second print mode.

8. A non-transitory computer-readable medium containing a computer program for forming a plurality of dots of different sizes including a first dot and a second dot on a printing medium using an ink, the program, when executed by a computer, causing the computer to realize functions of:
   performing the printing by
   a first print mode having a plurality of gradation reproduction regions including a first gradation reproduction region of a first print mode which uses the first dot and does not use the second dot and a second gradation reproduction region of the first print mode which uses the first dot and the second dot, and
   a second print mode having a plurality of gradation reproduction regions including a first gradation reproduction region of a second print mode which uses the first dot and does not use the second dot and a second gradation reproduction region of the second print mode which uses the first dot and the second dot;
   making the first dot be smaller than the second dot;
   making a print speed in the first print mode be lower than a print speed in the second print mode; and
   making the first gradation reproduction region of the first print mode be larger than the first gradation reproduction region of the second print mode.

\* \* \* \* \*